(12) United States Patent
Je et al.

(10) Patent No.: US 12,108,250 B2
(45) Date of Patent: Oct. 1, 2024

(54) METHOD AND DEVICE FOR AUTHENTICATING ACCESS STRATUM IN NEXT GENERATION WIRELESS COMMUNICATION SYSTEM

(71) Applicant: Samsung Electronics Co., Ltd., Suwon-si (KR)

(72) Inventors: Donghyun Je, Suwon-si (KR); Jungsoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 17/535,209

(22) Filed: Nov. 24, 2021

(65) Prior Publication Data

US 2022/0167166 A1 May 26, 2022

(30) Foreign Application Priority Data

Nov. 26, 2020 (KR) .......................... 10-2020-0160985

(51) Int. Cl.
*H04L 29/06* (2006.01)
*H04L 9/40* (2022.01)
(Continued)

(52) U.S. Cl.
CPC ....... *H04W 12/069* (2021.01); *H04L 63/0869* (2013.01); *H04W 12/033* (2021.01)

(58) Field of Classification Search
CPC ............ H04W 12/069; H04W 12/033; H04W 12/041; H04W 12/0431; H04W 76/10; H04L 63/0869
See application file for complete search history.

(56) References Cited

U.S. PATENT DOCUMENTS 8,307,414 B2 11/2012 Zerfos et al.
8,347,079 B2 * 1/2013 Cho ...................... H04L 9/3268
713/171

(Continued)

FOREIGN PATENT DOCUMENTS

| CN | 107786515 A | 3/2018 |
|---|---|---|
| KR | 10-2019-0115515 A | 10/2019 |
| KR | 10-2020-0018546 A | 2/2020 |

OTHER PUBLICATIONS

J. Zhang, L. Yang, W. Cao and Q. Wang, "Formal Analysis of 5G EAP-TLS Authentication Protocol Using Proverif," in IEEE Access, vol. 8, pp. 23674-23688, 2020, doi: 10.1109/ACCESS.2020.2969474 (Year: 2020).*

(Continued)

*Primary Examiner* — Yogesh Paliwal

(57) ABSTRACT

The disclosure relates to a 5G or 6G communication system for supporting higher data transmission rates than 4G communication systems such as LTE systems. According to an embodiment, a method for operating a user equipment (UE) for a mutual authentication operation in an access stratum (AS) section comprises transmitting a first message including a first random value to a base station, receiving, from the base station, a second message including a second random value and a base station certificate for the base station, in response to the first message, and identifying information included in the base station certificate and verifying validity of the base station certificate, when the base station certificate is valid according to a result of the verification of the base station certificate.

13 Claims, 31 Drawing Sheets

(51) Int. Cl.
*H04W 12/033* (2021.01)
*H04W 12/069* (2021.01)

(56) References Cited

U.S. PATENT DOCUMENTS

2010/0031031 A1  2/2010 Tian et al.
2014/0149740 A1* 5/2014 Sato .................. H04L 9/006
                                         713/158

OTHER PUBLICATIONS

International Search Report and Written Opinion of the International Searching Authority dated Feb. 25, 2022, in connection with International Application No. PCT/KR2021/017356, 9 pages.
Edris, et al., "Network Service Federated Identity (NS-FId) Protocol for Service Authorization in 5G Network," 2020 Fifth International Conference on Fog and Mobile Edge Computing (FMEC), IEEE, Jul. 2020, 8 pages.
Zhang, et al., "Formal Analysis of 5G EAP-TLS Authentication Protocol Using Proverif," IEEE Access, vol. 8, Jan. 2020, 15 pages.
Zhang, et al., "Formal Verification of 5G-EAP-TLS Authentication Protocol," 2019 IEEE Fourth International Conference on Data Science in Cyberspace (DSC), 2019, 7 pages.
Supplementary European Search Report dated Mar. 5, 2024, in connection with European Application No. 21898586.9, 7 pages.

\* cited by examiner

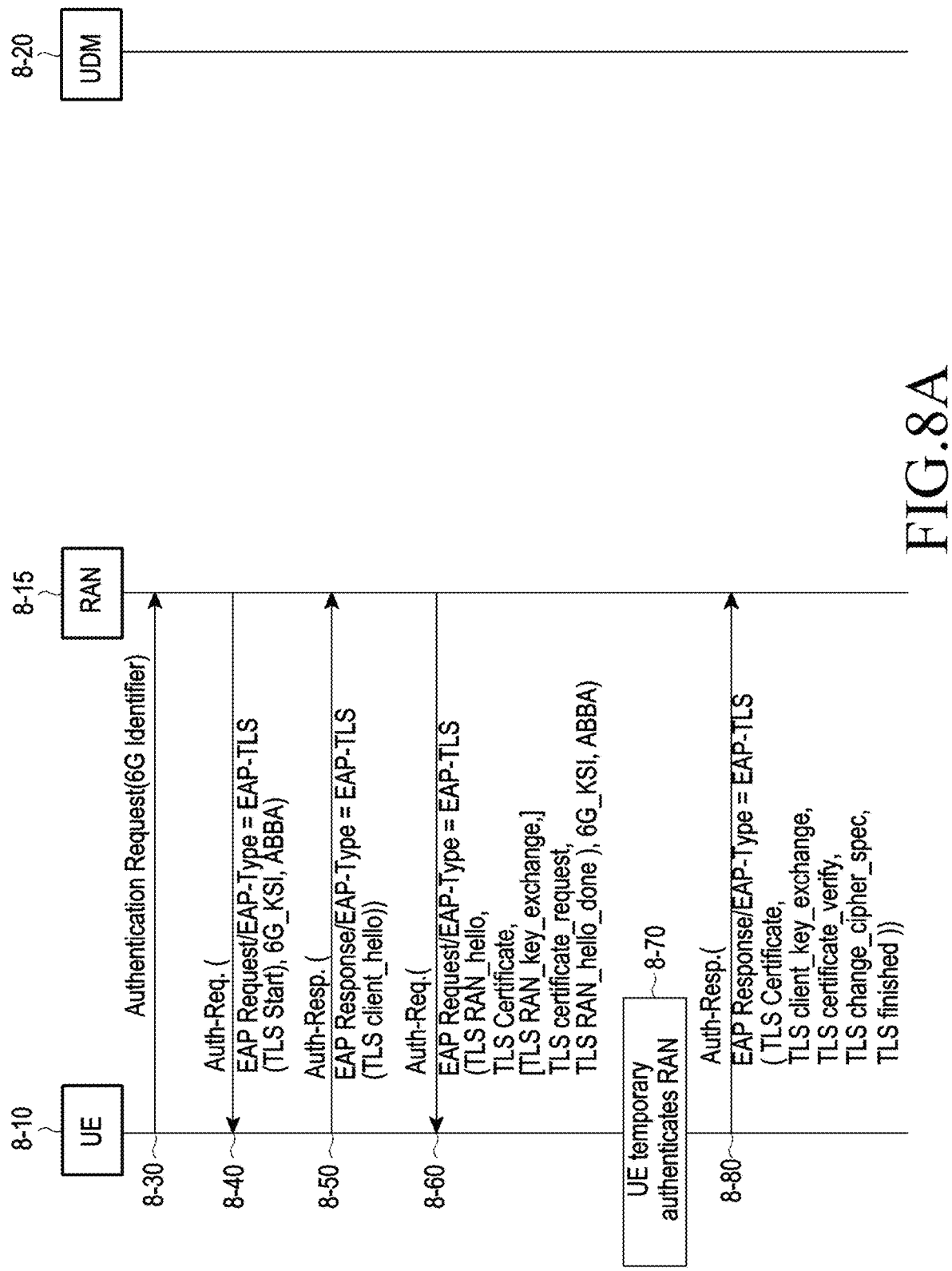

METHOD AND DEVICE FOR AUTHENTICATING ACCESS STRATUM IN NEXT GENERATION WIRELESS COMMUNICATION SYSTEM

CROSS-REFERENCE TO RELATED APPLICATION

This application is based on and claims priority under 35 U.S.C. § 119 to Korean Patent Application No. 10-2020-0160985 filed on Nov. 26, 2020, in the Korean Intellectual Property Office, the disclosure of which is herein incorporated by reference in its entirety.

BACKGROUND

1. Field

The disclosure relates to a method and device for mutual authentication between a UE and a base station based on a public key infrastructure (PKI) upon initial connection between a wireless device and a base station in a next-generation mobile communication system.

2. Description of Related Art

Wireless communication technologies have been developed mainly for human services, such as voice, multimedia, and data communication. As 5th-generation (5G) communication systems are commercially available, connected devices are expected to explosively increase and to be connected to a communication network. Examples of things connected to a network may include vehicles, robots, drones, home appliances, displays, smart sensors installed in various infrastructures, construction machinery, and factory equipment. Mobile devices will evolve into various form factors, such as augmented reality glasses, virtual reality headsets, and hologram devices. In the 6th-generation (6G) era, efforts are being made to develop an enhanced 6G communication system to provide various services by connecting hundreds of billions of devices and things. For this reason, the 6G communication system is called a beyond 5G system.

In the 6G communication system expected to be realized around year 2030, the maximum transmission rate is tera (i.e., 1000 gigabit) bps, and the wireless latency is 100 microseconds (pec). In other words, the transmission rate of the 6G communication system is 50 times faster than that of the 5G communication system, and the wireless latency is reduced to one tenth.

To achieve these high data rates and ultra-low latency, 6G communication systems are considered to be implemented in terahertz bands (e.g., 95 gigahertz (95 GHz) to 3 terahertz (3 THz) bands). As the path loss and atmospheric absorption issues worsen in the terahertz band as compared with millimeter wave (mmWave) introduced in 5G, technology that may guarantee signal reach, that is, coverage, would become more important. As major techniques for ensuring coverage, there need to be developed multi-antenna transmission techniques, such as new waveform, beamforming, massive multiple-input and multiple-output (MIMO), full dimensional MIMO (FD-MIMO), array antennas, or large-scale antennas, which exhibit better coverage characteristics than radio frequency (RF) devices and orthogonal frequency division multiplexing (OFDM). New technologies, such as a metamaterial-based lens and antennas, high-dimensional spatial multiplexing technology using an orbital angular momentum (OAM), and a reconfigurable intelligent surface (RIS), are being discussed to enhance the coverage of the terahertz band signals.

For 6G communication systems to enhance frequency efficiency and system network for 6G communication systems include full-duplex technology, there are being developed full-duplex technology in which uplink and downlink simultaneously utilize the same frequency resource at the same time, network technology that comprehensively use satellite and high-altitude platform stations (HAPSs), network architecture innovation technology that enables optimization and automation of network operation and supports mobile base stations, dynamic spectrum sharing technology through collision avoidance based on prediction of spectrum usages, artificial intelligence (AI)-based communication technology that uses AI from the stage of designing and internalizes end-to-end AI supporting function to thereby optimize the system, and next-generation distributed computing technology that realizes services that exceed the limitation of the UE computation capability by ultra-high performance communication and mobile edge computing (MEC) or clouds. Further, continuous attempts have been made to reinforce connectivity between device, further optimizing the network, prompting implementation of network entities in software, and increase the openness of wireless communication by the design of a new protocol to be used in 6G communication systems, implementation of a hardware-based security environment, development of a mechanism for safely using data, and development of technology for maintaining privacy.

Such research and development efforts for 6G communication systems would implement the next hyper-connected experience via hyper-connectivity of 6G communication systems which encompass human-thing connections as well as thing-to-thing connections. Specifically, the 6G communication system would be able to provide services, such as truly immersive extended reality (XR), high-fidelity mobile hologram, and digital replica. Further, services, such as remote surgery, industrial automation and emergency response would be provided through the 6G communication system thanks to enhanced security and reliability and would have various applications in medical, auto, or home appliance industries.

SUMMARY

There is provided a method and device for public key infrastructure (PKI)-based mutual authentication between a UE and a base station in a wireless section between a terminal and a base station in a wireless communication system.

According to an embodiment, a method for operating a user equipment (UE) for mutual authentication in an access stratum (AS) section in a wireless communication system comprises transmitting a first message including a first random value to a base station, receiving, from the base station, a second message including a second random value and a base station certificate for the base station, in response to the first message, identifying information included in the base station certificate and verifying validity of the base station certificate, when the base station certificate is valid according to a result of the verification of the base station certificate, transmitting, to the base station, a third message including a UE certificate and a temporary session key, and when authentication of the UE certificate is complete, receiving, from the base station, a fourth message indicating that mutual authentication between the UE and the base station is complete. In this case, a session key for the base station may be generated based on the first random value, the second random value, and the temporary session key.

The method may further comprise transmitting a certificate revocation information request message to the base station to receive revocation information for the base station certificate from a certificate verification server, and receiving, from the base station, a certificate revocation information response message including the revocation information for the base station certificate transmitted from the certificate verification server.

According to an embodiment, the revocation information for the base station certificate may be a credential revocation list (CRL) indicating a certificate revocation list or an online certificate status protocol (OCSP) for identifying whether the certificate of the base station certificate is revoked.

The method may further comprise performing a mutual authentication procedure between the UE and a certificate verification server, transmitting a certificate revocation information request message to the certificate verification server to request revocation information for the base station certificate, and receiving, from the certificate verification server, a certificate revocation information response message including the revocation information for the base station certificate.

According to an embodiment, the revocation information for the base station certificate may be a credential revocation list (CRL) indicating a certificate revocation list or an online certificate status protocol (OCSP) for identifying whether the certificate of the base station certificate is revoked.

According to an embodiment, the certificate revocation information request message may be encrypted based on at least one of the private key of the UE, a hash function, and an operator public key.

According to an embodiment, the certificate revocation information request message may be encrypted together with at least one of identification information for the entity transmitting the certificate revocation information request message and time information for transmission of the certificate revocation information request message.

According to an embodiment, the certificate revocation information response message may be encrypted based on at least one of a private key of the UE, a hash function, or an operator public key.

According to an embodiment, the certificate revocation information response message may be encrypted together with at least one of identification information for the entity that receives the certificate revocation information response message and time information for transmission of the certificate revocation information response message.

According to an embodiment, the revocation information for the base station certificate may be managed per registration area (RA) or per tracking area (TA) based on location information for at least one base station and movement information for at least one UE.

The method may further comprise receiving a first system information block (SIB) from the base station, and receiving, from the base station, a second SIB including a credential revocation list (CRL) indicating a certificate revocation list based on the first SIB.

The method may further comprise performing a mutual authentication procedure with another base station when the base station certificate is invalid according to a result of verification of the base station certificate, transmitting, to a certificate verification server, an authentication failure report message indicating failure in mutual authentication with the base station when the mutual authentication procedure with the other base station is complete, and receiving, from the certificate verification server, an authentication failure report response message corresponding to the authentication failure report message.

According to an embodiment, a method for operating a base station for mutual authentication in an access stratum (AS) section in a wireless communication system comprises receiving a first message including a first random value from a UE, transmitting, to the UE, a second message including a second random value and a base station certificate for the base station, in response to the first message, when authentication of the base station certificate is complete, receiving, from the UE, a third message including a UE certificate and a temporary session key, and identifying information included in the UE certificate and verifying validity of the UE certificate, and when the UE certificate is valid, transmitting, to the UE, a fourth message indicating that mutual authentication between the UE and the base station is complete.

According to an embodiment, session keys for the UE and the base station may be generated based on the first random value, the second random value, and the temporary session key.

The method may further comprise receiving a certificate revocation information request message from the UE for the UE to receive revocation information for the base station certificate from a certificate verification server, and transmitting, to the UE, a certificate revocation information response message including the revocation information for the base station certificate transmitted from the certificate verification server.

According to an embodiment, the revocation information for the base station certificate may be a credential revocation list (CRL) indicating a certificate revocation list or an online certificate status protocol (OCSP) for identifying whether the certificate of the base station certificate is revoked.

According to an embodiment, the certificate revocation information request message may be encrypted based on at least one of the private key of the UE, a hash function, and an operator public key.

According to an embodiment, the certificate revocation information response message may be encrypted based on at least one of the private key of the UE, a hash function, and an operator public key.

According to an embodiment, the revocation information for the base station certificate may be managed per registration area (RA) or per tracking area (TA) based on location information for at least one base station and movement information for at least one UE.

The method may further comprise transmitting a certificate revocation information request message for the UE certificate to a certificate verification server to receive revocation information for the UE certificate, and receiving, from the certificate verification server, a certificate revocation information response message including the revocation information for the UE certificate.

According to an embodiment, the revocation information for the UE certificate may be a credential revocation list indicating a certificate revocation list or an online certificate status protocol (OCSP) for identifying whether the UE certificate is revoked.

The method may further comprise transmitting a first system information block (SIB) to the UE, and transmitting, to the UE, a second SIB including a credential revocation list (CRL) indicating a certificate revocation list based on the first SIB.

According to an embodiment, a user equipment (UE) configured to perform mutual authentication in an access stratum (AS) section in a wireless communication system comprises a transceiver and a controller connected with the transceiver and controlling the transceiver. The controller may be configured to control to transmit a first message including a first random value to a base station, control to receive, from the base station, a second message including a second random value and a base station certificate for the base station, in response to the first message, identify information included in the base station certificate and verify validity of the base station certificate, when the base station certificate is valid according to a result of the verification of the base station certificate, control to transmit, to the base station, a third message including a UE certificate and a temporary session key, and when authentication of the UE certificate is complete, control to receive, from the base station, a fourth message indicating that mutual authentication between the UE and the base station is complete.

According to an embodiment, session keys for the UE and the base station may be generated based on the first random value, the second random value, and the temporary session key.

According to an embodiment, a base station configured to perform mutual authentication in an access stratum (AS) section in a wireless communication system comprises a transceiver and a controller connected with the transceiver and controlling the transceiver. The controller may be configured to control to receive a first message including a first random value from a UE, control to transmit, to the UE, a second message including a second random value and a base station certificate for the base station, in response to the first message, when authentication of the base station certificate is complete, control to receive, from the UE, a third message including a UE certificate and a temporary session key, identify information included in the UE certificate and verify validity of the UE certificate, and when the UE certificate is valid, control to transmit, to the UE, a fourth message indicating that mutual authentication between the UE and the base station is complete. According to an embodiment, session keys for the UE and the base station may be generated based on the first random value, the second random value, and the temporary session key.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A and 8B are views illustrating a procedure for identifying the validity of a certificate upon performing PKI-based authentication when a UE establishes a connection with a base station according to an embodiment;

The same or similar reference denotations may be used to refer to the same or similar elements throughout the specification and the drawings.

DETAILED DESCRIPTION

Figure 1:
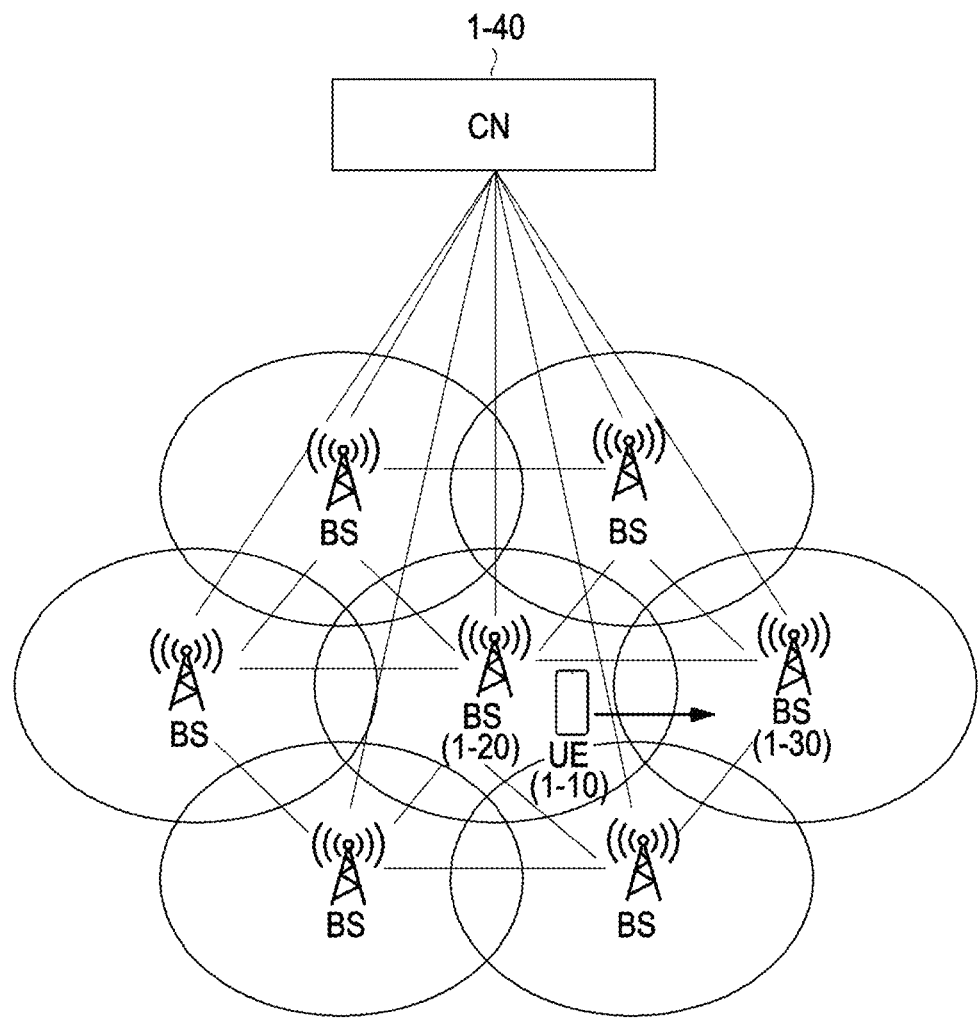
FIG. 1 is a view illustrating a structure of an LTE system according to an embodiment.

FIGS. 1 through 32, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Wireless communication systems evolve beyond voice-centered services to broadband wireless communication systems to provide high data rate and high-quality packet data services, such as 3rd generation partnership project (3GPP) high speed packet access (HSPA), long term evolution (LTE) or evolved universal terrestrial radio access (E-UTRA)), LTE-advanced (LTE-A), LTE-pro, 3GPP2 high rate packet data (HRPD), ultra-mobile broadband (UMB), and institute of electrical and electronics engineers (IEEE) 802.16e communication standards.

As a representative example of such broadband wireless communication system, LTE system adopts orthogonal frequency division multiplexing (OFDM) for downlink (DL) and single carrier frequency division multiple access (SC-FDMA) for uplink (UL). Uplink refers to a radio link in which a UE (terminal or MS) transmits data or control signals to a base station (gNB, generation Node B or eNB, eNode B or BS), and downlink refers to a radio link in which the base station transmits data or control signals to the UE. Such multiple access scheme allocates and operates time-frequency resources carrying data or control information per user not to overlap, i.e., to maintain orthogonality, to thereby differentiate each user's data or control information.

Post-LTE communication systems, e.g., 5G communication systems, are required to freely reflect various needs of users and service providers and thus to support services that simultaneously meet various requirements. Services considered for 5G communication systems include, e.g., enhanced mobile broadband (eMBB), massive machine type communication (mMTC), and ultra-reliability low latency communication (URLLC).

eMBB aims to provide a further enhanced data transmission rate as compared with LTE, LTE-A, or LTE-pro. For example, eMBB for 5G communication systems needs to provide a peak data rate of 20 Gbps on download and a peak data rate of 10 Gbps on uplink in terms of one base station. 5G communication systems also need to provide an increased user perceived data rate while simultaneously providing such peak data rate. To meet such requirements, various transmit (TX)/receive (RX) techniques, as well as multiple input multiple output (MIMO), need to further be enhanced. While LTE currently adopts a TX bandwidth up to 20 MHz in the 2 GHz band to transmit signals, the 5G communication system employs a broader frequency bandwidth in a frequency band ranging from 3 GHz to 6 GHz or more than 6 GHz to meet the data rate required for 5G communication systems.

mMTC is also considered to support application services, such as Internet of things (IoT) in the 5G communication system. To efficiently provide IoT, mMTC is required to support massive UEs in the cell, enhance the coverage of the UE and the battery time, and reduce UE costs. IoT terminals are attached to various sensors or devices to provide communication functionality, and thus, it needs to support a number of UEs in each cell (e.g., 1,000,000 UEs/km$^2$). Since mMTC-supportive UEs, by the nature of service, are highly likely to be located in shadow areas not covered by the cell, such as the underground of a building, it requires much broader coverage as compared with other services that the 5G communication system provides. mMTC-supportive UEs, due to the need for being low cost and difficulty in frequently exchanging batteries, are required to have a very long battery life, e.g., 10 years to 15 years.

URLLC is a mission-critical, cellular-based wireless communication service. For example, URLLC may be considered for use in remote control for robots or machinery, industrial automation, unmanned aerial vehicles, remote health care, or emergency alert. This requires that URLLC provide very low-latency and very high-reliability communication. For example, URLLC-supportive services need to meet an air interface latency of less than 0.5 milliseconds simultaneously with a packet error rate of $10^{-5}$ or less. Thus, for URLLC-supportive services, the 5G communication system is required to provide a shorter transmit time interval (TTI) than those for other services while securing reliable communication links by allocating a broad resource in the frequency band.

The three 5G services, i.e., eMBB, URLLC, and mMTC, may be multiplexed in one system and be transmitted. In this case, the services may adopt different TX/RX schemes and TX/RX parameters to meet their different requirements.

More advanced services, such as mobile hologram, virtual reality, and augmented reality, are emerging in communication. To support these services, element technologies, such as artificial intelligence (AI) technology, sensing technology, wired/wireless communication and network infrastructure, service interface technology, and security technology, are being studied in communication systems.

Hereinafter, embodiments of the disclosure are described in detail with reference to the accompanying drawings.

In describing embodiments, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub-units. Further, an element or a 'unit' may be implemented to reproduce one or more CPUs in a device or a security multimedia card. According to embodiments of the disclosure, a " . . . unit" may include one or more processors.

As used herein, terms for identifying access nodes, terms denoting network entities, terms denoting messages, terms denoting inter-network entity interfaces, and terms denoting various pieces of identification information are provided as an example for ease of description. Thus, the disclosure is not limited by the terms, and such terms may be replaced with other terms denoting objects with equivalent technical concept.

For ease of description, the disclosure adopts the terms and names defined in the standards for 5G or NR or LTE systems. However, the disclosure is not limited by such terms and names and may be likewise applicable to systems conforming to other standards.

The description of embodiments of the disclosure focuses primarily on 3GPP communication standards, but the subject matter of the disclosure may also be applicable to other communication systems with a similar technical background with minor changes without significantly departing from the scope of the disclosure, and this may be so performed by the determination of those skilled in the art to which the disclosure pertains.

FIG. 1 is a view illustrating a structure of an LTE system according to an embodiment.

FIG. 1 illustrates an example in which a UE moves to change a base station to which the UE is to connect among a plurality of base stations in a mobile communication system according to an embodiment.

The base stations 1-20 and 1-30 may be connected with some of their neighboring base stations, and the base stations 1-20 and 1-30 may be connected to a mobile communication core network (CN) 1-40, such as an evolved packet core (EPC) or 5G core network (5GC).

The radio access technology for the base stations 1-20 and 1-30 may be LTE, NR, or Wi-Fi, etc., but is not limited thereto. For example, the base stations 1-20 and 1-30 may be mobile communication base stations that are irrelevant to the radio access technology.

The UE 1-10 may be connected with a base station to receive a mobile communication service. As the UE 1-10 moves, the connected base station may be changed, and the UE 1-10 may seamlessly receive the mobile communication service via a handover or handoff (HO) procedure. In the example of FIG. 1, the UE 1-10 may connect to the base station 1-20 and then disconnect from the base station 1-20 via handover while connecting to another base station 1-30.

Figure 2:
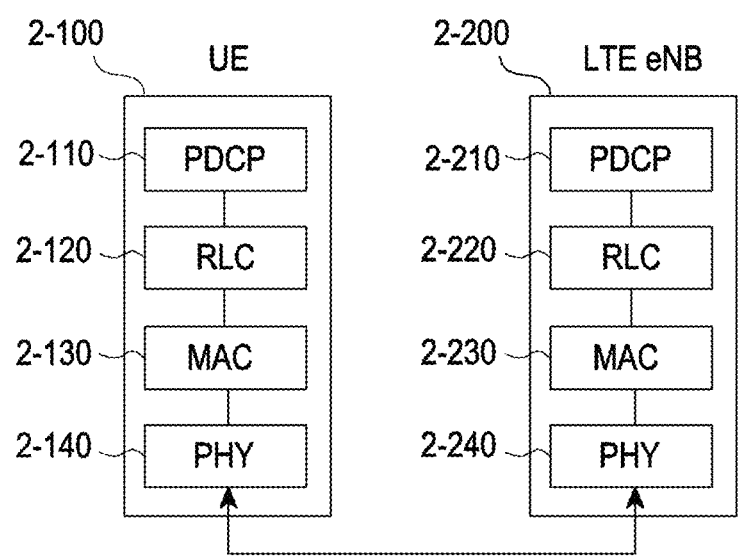
FIG. 2 is a view illustrating a structure of a radio protocol in an LTE system according to an embodiment.

FIG. 2 is a view illustrating a structure of a radio protocol in an LTE system according to an embodiment.

Referring to FIG. 2, LTE system radio protocols include packet data convergence protocols (PDCPs) 2-110 and 2-210, radio link controls (RLCs) 2-120 and 2-220, and medium access controls (MACs) 2-130 and 2-230 for a UE 2-100 and a base station 2-200, respectively. The components of the radio protocol may be referred to as layers or entities, or devices.

The PDCPs 2-110 and 2-210 are in charge of IP header compression/reconstruction. The major functions of the PDCP may be summarized as follows:
  Header compression and decompression (ROHC only);
  Transfer of user data;
  In-sequence delivery of upper layer PDUs at PDCP re-establishment procedure for RLC AM;
  For split bearers in DC (only support for RLC AM), PDCP PDU routing for transmission and PDCP PDU reordering for reception;
  Duplicate detection of lower layer service data units (SDUs) at PDCP re-establishment procedure for RLC AM;
  Retransmission of PDCP SDUs at handover and, for split bearers in DC, of PDCP PDUs at PDCP data-recovery procedure, for RLC AM;
  Ciphering and deciphering; and/or
  Timer-based SDU discard in uplink.

The radio link controls (RLCs) 2-120 and 2-220 reconfigure a PDCP packet data unit (PDU) to an appropriate size and perform an ARQ operation. The major functions of the RLC may be summarized as follows:
  Transfer of upper layer PDUs;
  Error correction through ARQ (only for AM data transfer);
  Concatenation, segmentation and reassembly of RLC SDUs (only for UM and AM data transfer);
  Re-segmentation of RLC data PDUs (only for AM data transfer);
  Reordering of RLC data PDUs (only for UM and AM data transfer);
  Duplicate detection (only for UM and AM data transfer);
  Protocol error detection (only for AM data transfer);
  RLC SDU discard (only for UM and AM data transfer); and/or
  RLC re-establishment.

The MACs 2-130 and 2-230 are connected with several RLC layer devices configured in one UE, multiplex the RLC PDUs into a MAC PDU and demultiplex the MAC PDU into RLC PDUs. The major functions of the MAC may be summarized as follows:
  Mapping between logical channels and transport channels;
  Multiplexing/demultiplexing of MAC SDUs belonging to one or different logical channels into/from transport blocks (TB) delivered to/from the physical layer on transport channels;
  Scheduling information reporting;
  Error correction through HARQ;
  Priority handling between logical channels of one UE;
  Priority handling between UEs by means of dynamic scheduling;
  MBMS service identification;
  Transport format selection; and/or
  Padding.

The physical layers 2-140 and 2-240 channel-code and modulate higher layer data into OFDM symbols, transmit the OFDM symbols through a wireless channel or demodulates OFDM symbols received through a wireless channel, channel-decodes and transfers the same to a higher layer.

Figure 3:
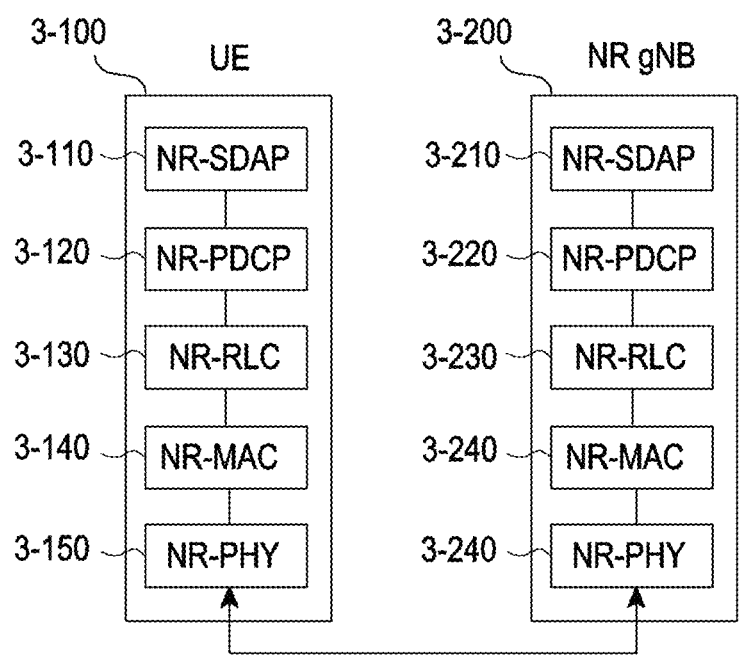
FIG. 3 is a view illustrating a structure of a radio protocol of a next-generation mobile communication system according to an embodiment.

FIG. 3 is a view illustrating a structure of a radio protocol of a next-generation mobile communication system according to an embodiment.

Referring to FIG. 3, the radio protocols for the next-generation mobile communication system include NR service data application protocols (SDAPs) 3-110 and 3-210, NR PDCPs 3-120 and 3-220, NR RLCs 3-130 and 3-230, and NR MACs 3-140 and 3-240, in a UE 3-100 and an NR base station 3-200, respectively. The components of the radio protocol may be referred to as layers or entities, or devices.

The main functions of the NR SDAPs 3-110 and 3-210 may include some of the following functions:
  Transfer of user plane data;
  Mapping between a QoS flow and a DRB for both DL and UL;
  Marking QoS flow ID in both DL and UL packets; and/or
  Reflective QoS flow to DRB mapping for the UL SDAP PDUs.

For the SDAP layer device, the UE may be set, via an RRC message, for whether to use the functions of the SDAP layer or the header of the SDAP layer device per PDCP layer device, per bearer, or per logical channel. If an SDAP header has been set, the UE may be instructed to update or reset mapping information for the data bearer and QoS flow of uplink and downlink, by a one-bit NAS reflective QoS indicator and a one-bit AS reflective QoS indicator. The SDAP header may include QoS flow ID information indicating QoS. The QoS information may be used as data priority handling or scheduling information for seamlessly supporting a service.

The main functions of the NR PDCPs 3-120 and 3-220 may include some of the following functions:
Header compression and decompression (ROHC only);
Transfer of user data;
In-sequence delivery of upper layer PDUs;
Out-of-sequence delivery of upper layer PDUs;
PDCP PDU reordering for reception;
Duplicate detection of lower layer SDUs;
Retransmission of PDCP SDUs;
Ciphering and deciphering; and/or
Timer-based SDU discard in uplink.

The reordering by the NR PDCP refers to reordering PDCP PDUs received by the lower layer based on the PDCP sequence numbers (SNs) and may include transferring the data to the higher layer in the reordered sequence or immediately without considering order, recording PDCP PDUs missed by reordering, reporting the state of the missing PDCP PDUs to the transmit part, and requesting to retransmit the missing PDCP PDUs.

The main functions of the NR RLCs 3-130 and 3-230 may include some of the following functions:
Transfer of upper layer PDUs;
In-sequence delivery of upper layer PDUs;
Out-of-sequence delivery of upper layer PDUs;
Error correction through ARQ;
Concatenation, segmentation and reassembly of RLC SDUs;
Re-segmentation of RLC data PDUs;
Reordering of RLC data PDUs;
Duplicate detection;
Protocol error detection;
RLC SDU discard; and/or
RLC re-establishment.

The in-sequence delivery by the NR RLC refers to transferring the RLC SDUs received from the lower layer to the higher layer in order and, if one original RLC SDU is split into several RLC SDUs that are then received, the in-sequence delivery may include reassembling and transferring them, reordering the received RLC PDUs based on the RLC SNs or PDCP SNs, recording the RLC PDUs missed by reordering, reporting the state of the missing RLC PDUs to the transmit part, and requesting to retransmit the missing RLC PDUs and, if there are missing RLC SDUs, the in-sequence delivery may include transferring only RLC SDUs before the missing RLC SDUs to the higher layer in order. Although there are missing RLC SDUs, if a predetermined timer has expired, the in-sequence delivery may include transferring all of the RLC SDUs received before the timer starts to the higher layer in order. Or, although there are missing RLC SDUs, if the predetermined timer has expired, the in-sequence delivery may include transferring all of the RLC SDUs received thus far to the higher layer in order.

Further, the RLC PDUs may be processed in order of reception (in order of arrival regardless of the SN sequence) and delivered to the PDCP device regardless of order (out-of-sequence delivery). If the received RLC PDU is a segment, segments which are stored in a buffer or are to be received later may be received and reconstructed into a single whole RLC PDU, and then, the whole RLC PDU is processed and transferred to the PDCP device. The NR RLC layer may not include the concatenation function, and the function may be performed by the NR MAC layer or replaced with a multiplexing function of the NR MAC layer.

The out-of-sequence delivery of the NR RLC device refers to a function of directly delivering the RLC SDUs received from a lower layer to a higher layer regardless of order. The out-of-sequence delivery may include the function of reassembling and transferring several received RLC SDUs, into which a single RLC SDU has been segmented and may further include the functions of storing the RLC SNs or PDCP SNs of the received RLC PDUs, reordering them, and recording lost RLC PDUs.

The NR MACs 3-140 and 3-230 may be connected to several NR RLC layer devices configured in one UE, and the major functions of the NR MAC may include some of the following functions:
Mapping between logical channels and transport channels;
Multiplexing/demultiplexing of MAC SDUs;
Scheduling information reporting;
Error correction through HARQ;
Priority handling between logical channels of one UE;
Priority handling between UEs by means of dynamic scheduling;
MBMS service identification;
Transport format selection; and/or
Padding.

The NR PHY layers 3-150 and 3-250 channel-code and modulate higher layer data into OFDM symbols, transmit the OFDM symbols through a wireless channel or demodulates OFDM symbols received through a wireless channel, channel-decodes and transfers the same to a higher layer.

Figure 4:
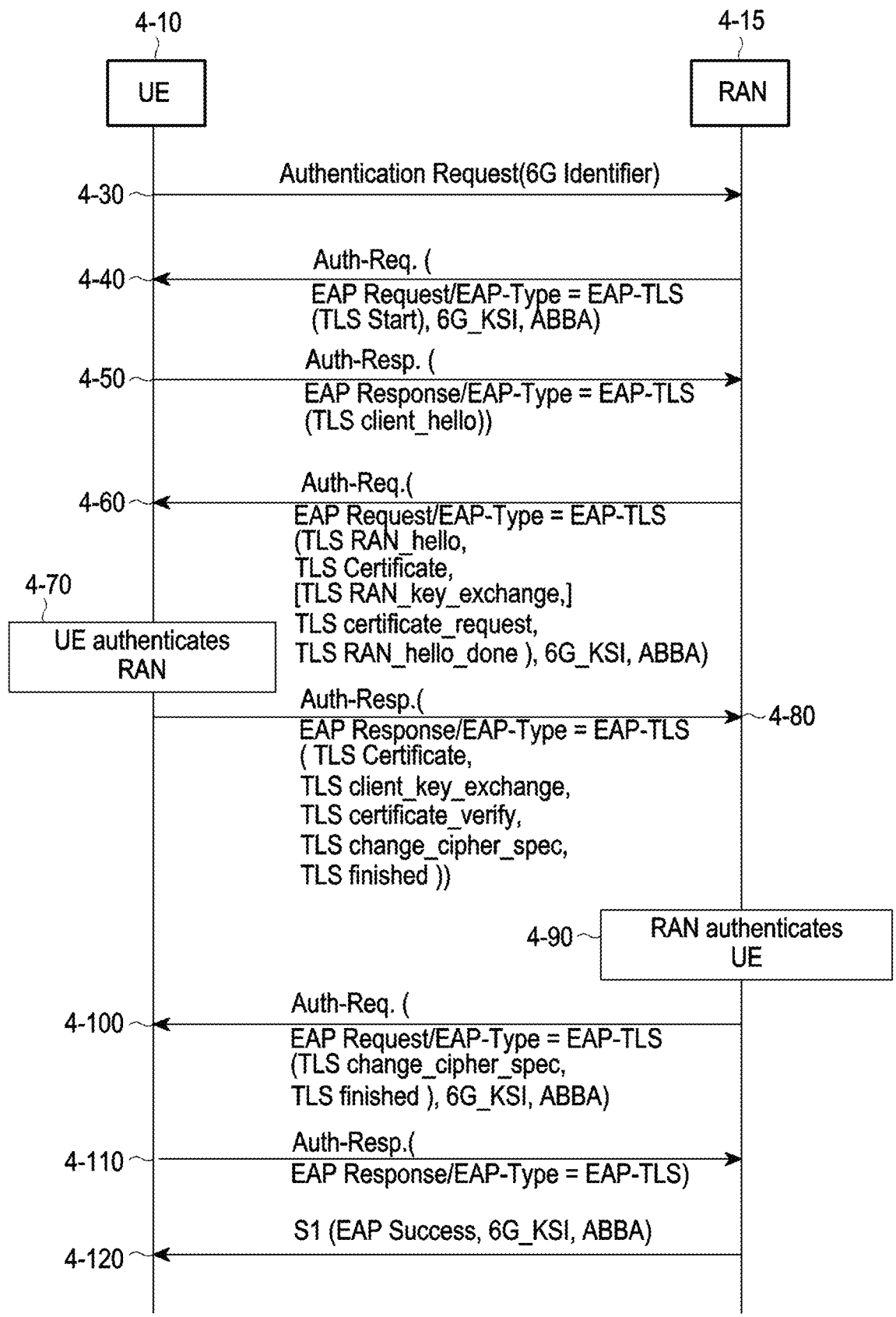
FIG. 4 is a view illustrating a procedure for performing public key infrastructure (PKI)-based authentication when a UE establishes a connection with a base station according to an embodiment.

FIG. 4 is a view illustrating a procedure for performing public key infrastructure (PKI)-based authentication when a UE establishes a connection with a base station according to an embodiment.

FIG. 4 illustrates a procedure for a UE 4-10 to perform mutual authentication with a base station 4-15 upon initial access to the base station or when the UE switches from an RRC idle mode or RRC inactive mode (or lightly-connected mode) to an RRC connected mode to connect to a network.

In this case, mutual authentication may include 1) session key generation (Key Encapsulation) and 2) counterpart authentication (Authentication). Session key generation (Key Encapsulation) is the process of generating a session key for secure communication between "communication targets" over the network, and counterpart authentication (Authentication) means a process for authenticating that the "entity generating a message" over the network is a "communication target."

In the disclosure, for session key generation (Key Encapsulation), the UE 4-10 and the base station 4-15 may exchange a random value for preventing eavesdropping by an entity other than the communication target and a PreMasterSecret for preventing man in the middle (MITM) and then generate a gNB key.

Further, in the disclosure, for the counterpart authentication (Authentication), the UE 4-10 and the base station 4-15 perform a certificate reception, a check on whether the valid period of the certificate has expired, a validity check on the certificate, and a check on the content of the certificate. In this case, the validity check on the certificate means checking such an event as certificate issuance cancellation, false issuance, certificate errors, and secret key exposure.

In FIG. 4, the UE 4-10 may first transmit an authentication request message (Authentication Request) including its own 6G identifier to the base station 4-15 to access the base station 4-15 (4-30).

The base station 4-15 receives the authentication request message from the UE 4-10 and may then send, to the UE 4-10, a message (Auth-Req.) for requesting to authenticate the EAP-TLS (TLS start) for the base station 4-15 (4-40). The base station 4-15 may include, in the authentication request message (Auth-Req), a 6G key set identifier (6G_KSI), which is an identifier for the authentication, and an anti-bidding down between architectures (ABBA) parameter for preventing a bidding-down of the security feature from the higher release to the lower release, and transmit them (4-40).

When the UE 4-10 receives the TLS start information from the base station 4-15, the UE 4-10 may transmit an authentication response message (Auth-Resp.) including TLS client_hello information to the base station 4-15 (4-50). The TLS client_hello information may mean a random value (or client seed value) for preventing eavesdropping by an entity other than the communication target.

Upon receiving the TLS client_hello information included in the authentication response message (Auth-Resp.) of the UE 4-10, the base station 4-15 may transmit, to the UE 4-10, an authentication request message (Auth-Req.) including at least one of TLS RAN_hello, TLS certificate (base station 4-15 certificate), TLS RAN_key_exchange (temporary session key), TLS certificate_request (whether a UE certificate is requested), TLS RAN_hello_done information, 6G KSI, and ABBA (4-60). The TLS RAN_hello information may include a random value (or RAN seed value) for preventing eavesdropping by an entity other than the communication target. The TLS RAN_key_exchange information may include a temporary session key (PreMasterSecret) for preventing man in the middle (MITM).

In this case, the base station 4-15 may verify the UE certificate by setting a certificate_request unless a TLS emergency call is used. The UE 4-10 identifies the base station certificate (TLS certificate) included in the authentication request message (Auth-Req.) of the base station 4-15, and may perform authentication as to whether the base station certificate (TLS certificate) is a legitimate certificate (4-70). The UE 4-10 may identify whether the valid period of the base station certificate (TLS certificate) has expired, check the validity of the base station certificate (TLS certificate), and identify the contents of the base station certificate (TLS certificate). The UE 4-10 may perform a validity check on the base station certificate (TLS certificate) by identifying whether there is an event, such as certificate issuance cancellation, false issuance, certificate error, or secret key exposure.

The procedure in which the UE 4-10 authenticates the base station certificate is described below in detail in connection with the drawings.

After identifying that there is no abnormality in the certificate of the base station 4-15, the UE 4-10 may transmit, to the base station 4-15, an authentication response message (Auth-Resp.) including at least one of a TLS certificate (UE certificate), TLS client_key_exchange (temporary session key), TLS certificate_verify, TLS change_cipher_spec (possible chipper spec information), and TLS finish information (4-80). The TLS client_key_exchange information may include a temporary session key (PreMasterSecret) for preventing man in the middle (MITM).

According to an embodiment, the UE 4-10 may encrypt the temporary session key (TLS client_key_exchange) with the base station public key and transmit the temporary session key to the base station 4-15.

After receiving the certificate of the UE 4-10, the base station 4-15 identifies the certificate of the UE 4-10 (4-90). The base station 4-15 may identify whether the valid period of the UE certificate (TLS certificate) has expired, check the validity of the base station certificate (TLS certificate), and identify the contents of the UE certificate (TLS certificate). The base station 4-15 may perform a validity check on the UE certificate (TLS certificate) by identifying whether there is an event, such as certificate issuance cancellation, false issuance, certificate error, or secret key exposure.

The base station 4-15 may identify the certificate of the UE 4-10, select an appropriate one among the cipher specs transmitted by the UE 4-10, specify the certificate of the UE 4-10 in the TLS change_cipher_spec, and transmit, to the UE 4-10, an authentication request message (Auth-Req.) including TLS finished information (4-100). The authentication request message (Auth-Req.) may include 6G KSI and ABBA information (4-100).

The UE 4-10 may transmit an authentication response message (Auth-Resp), as a message responsive to the authentication request message (Auth-Req.), to the base station 4-15 (4-110). The base station 4-15 may use the most significant 256 (128) bits of the generated EMSK as a session key (gNB key). A pseudo-random function (PRF) may be used when generating the EMSK. For example, an EMSK may be generated via a hash-based RFC4306, using parameters including the first random value, the second random value, and the temporary session key (PreMasterSecret). Here, the authentication response message (Auth-Resp) may include an EAP response and an EAP type (EAP-TLS).

The base station 4-15 may transmit, to the UE 4-10, an EAP success message indicating that it is normally authenticated with the UE 4-10 (EAP Success), including 6G-KSI and ABBA parameters, and inducing a gNB key (4-120). Upon receiving the EAP Success message, the UE 4-10 may use the most significant 256 (128) bits of the EMSK as the session key (gNB key), as does the base station 4-15.

In other words, the UE 4-10 may generate a session key using the temporary session key (TLS client_key_exchange) and information required for authentication. A pseudo-random function (PRF) may be used when generating the EMSK. For example, an EMSK may be generated via a hash-based RFC4306, using parameters including the first random value, the second random value, and the temporary session key (PreMasterSecret). The base station 4-15 may generate a session key using the temporary session key (TLS client_key_exchange) and information required for authentication. According to an embodiment, the base station 4-15 and the UE 4-10 may negotiate an encryption algorithm after generating the session key.

Figure 5A:
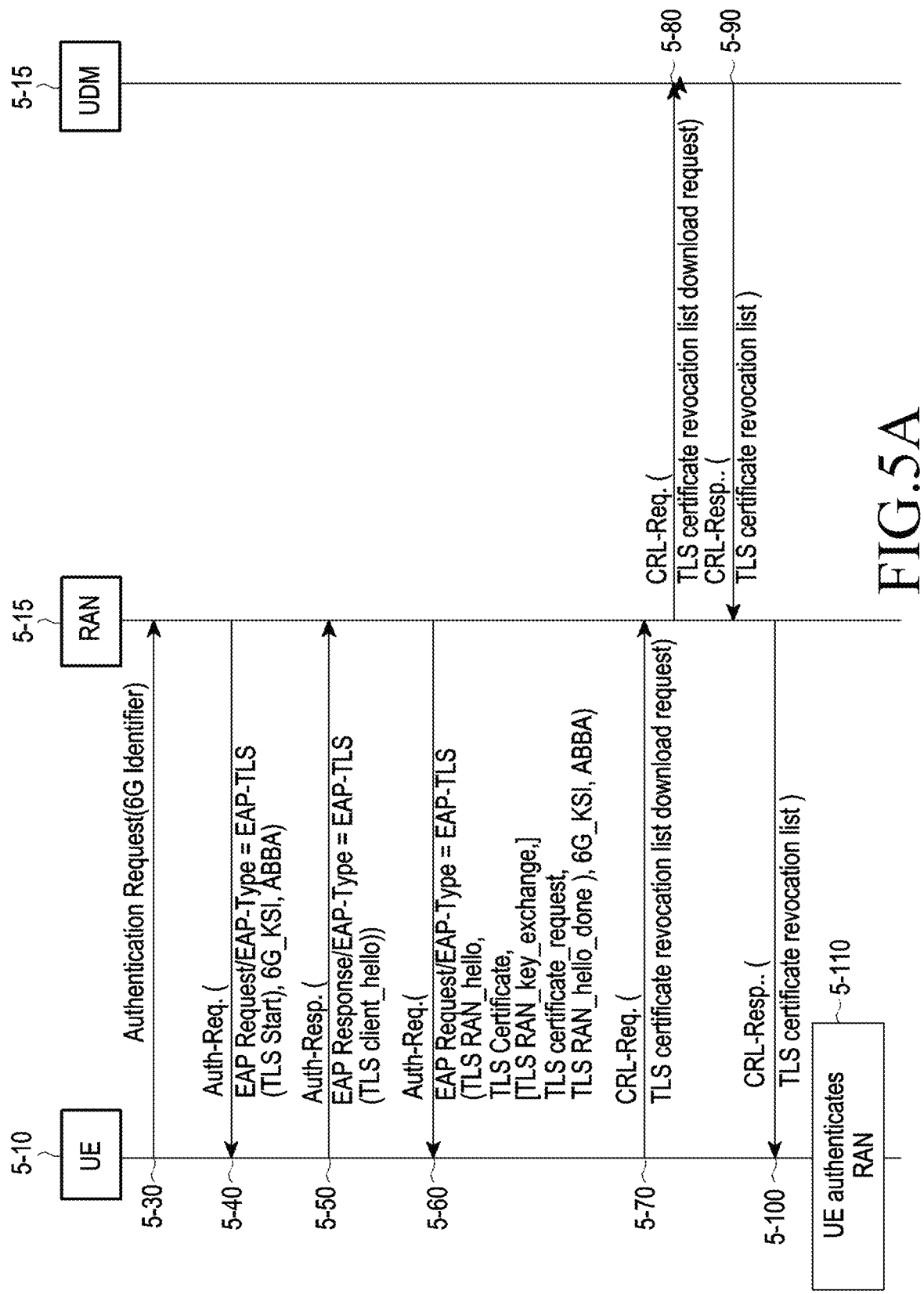
FIGS. 5A and 5B are views illustrating a procedure for identifying the validity of a certificate upon performing PKI-based authentication when a UE establishes a connection with a base station according to an embodiment.
Figure 5B:
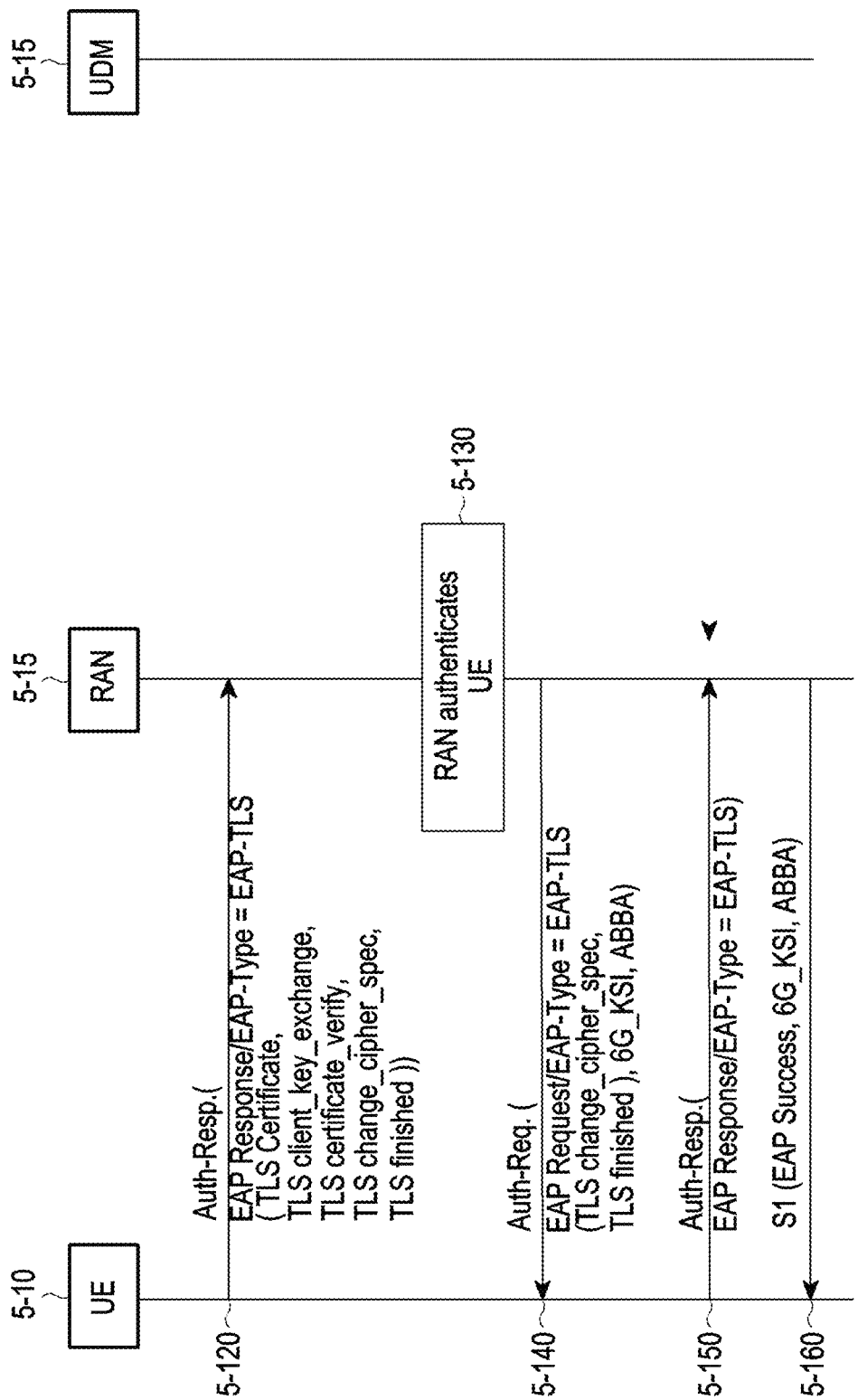

FIGS. 5A and 5B are views illustrating a procedure for identifying the validity of a certificate upon performing PKI-based authentication when a UE establishes a connection with a base station according to an embodiment.

FIGS. 5A and 5B illustrate a procedure for a UE to perform mutual authentication with a base station upon initial access to the base station or when the UE switches from an RRC idle mode or RRC inactive mode (or lightly-connected mode) to an RRC connected mode to connect to a network.

In the embodiment of FIGS. 5A and 5B, there is provided operations for downloading a credential revocation list (CRL) during a mutual authentication process and identifying whether the CRL includes a certificate of a corresponding base station (or a certificate of a corresponding UE). In this case, since the UE 5-10 does not communicate and is thus unable to send a request for the CRL to a network entity (e.g., a certificate authority (CA) server), there is needed a procedure for the base station 5-15 to forward (or allow) the UE's CRL request message to the network.

The UE 5-10 may first transmit an authentication request message (authentication request) including its own 6G identifier to the base station 5-15 to access the base station 5-15 (5-30). After receiving the authentication request message of the UE 5-10, the base station 5-15 may transmit, to the UE 5-10, a message (Auth-Req.) for requesting authentication on the base station 5-15 with EAP-TLS (TLS start) (5-40). The base station 5-15 may include, in the authentication request message (Auth-Req), a 6G key set identifier (6G_KSI), which is an identifier for the authentication, and an ABBA parameter for preventing a bidding-down of the security feature from the higher release to the lower release (5-40).

When the UE 5-10 receives the TLS start information from the base station 5-15, the UE 5-10 may transmit an authentication response message (Auth-Resp.) including TLS client_hello information to the base station 5-15 (5-50).

Upon receiving the TLS client_hello information included in the authentication response message (Auth-Resp.) of the UE 5-10, the base station 5-15 may transmit, to the UE 5-10, an authentication request message (Auth-Req.) including at least one of TLS RAN_hello, TLS certificate (base station certificate), TLS RAN_key_exchange, TLS certificate_request (whether a UE certificate is requested), TLS RAN_hello_done information, 6G KSI, and ABBA parameter (5-60).

In this case, the base station 5-15 may verify the UE certificate by setting a certificate_request unless a TLS emergency call is used. The UE 5-10 need verify the base station certificate included in the authentication request message of the base station 5-15. Since the base station certificate was legitimately signed by the CA but may have been revoked later, the UE 5-10 needs an additional check.

Therefore, the UE 5-10 is required to receive a credential revocation list (CRL) that records whether the base station certificate has been revoked from the CA included in the base station certificate or a server designated by the CA for certificate verification.

To transmit a CRL request message (CRL-req) to a unified data management (UDM) 5-30 to receive the CRL for the base station certificate, the UE 5-10 may send a CRL request message (CRL-req (TLS certificate revocation list download request)) to the base station 5-15 (5-70).

Since the UE 5-10 has not been authenticated yet when the CRL request message (CRL-req) is received, the base station 5-15 is supposed to reject NAS communication of the UE 5-10 as default. However, the base station 5-15 may exceptionally allow transmission of the CRL request message (CRL-req). The base station 5-15 may forward the CRL request message (CRL-req (TLS certificate revocation list download request)) to the network entity (NE), the UDM 5-20 in the illustrated case, which serves as the CA of the base station certificate (5-80). In this process, the UE 5-10 may determine whether to forward the CRL request message (CRL-req) to a server, which is known to the base station 5-15 as serving as a CA, based on the message contained in the packets, e.g., the IP, or the current information for the UE.

The UDM 5-20 may identify the CRL request message (CRL-Req) received from the UE 5-10 and, to transmit the CRL information requested by the UE 5-10, send a CRL response message (CRL-Resp (TLS certificate revocation list)) including CRL information to the base station 5-15 (5-90). The base station 5-15 may forward the CRL response message (TLS certificate revocation list (CRL-Resp)) including CRL information to the UE 5-10 (5-100).

The UE 5-10 may identify the base station certificate included in the authentication request message of the base station 5-15, and perform authentication as to whether the base station certificate is a legitimate certificate (5-110).

After identifying that there is no abnormality in the certificate of the base station 5-15, the UE 5-10 may transmit, to the base station 5-15, an authentication response message (Auth-Resp.) including at least one of a TLS certificate (UE certificate), TLS client_key_exchange, TLS certificate_verify, TLS change_cipher_spec (possible chipper spec information), and TLS finish information (5-120). After receiving the certificate of the UE 5-10, the base station 5-15 may identify the certificate of the UE 5-10 (5-130).

According to an embodiment, a procedure of receiving a certificate revocation list (CRL) for the UE certificate from the UDM 5-20 may be performed between operations 5-120 and 5-130.

To receive the CRL for the UE certificate, the base station 5-15 may transmit a CRL request message (CRL-req) for the UE certificate to the network entity (NE), the UDM 5-20 in the illustrated example, serving as the CA of the UE certificate. The UDM 5-20 may transmit a CRL response message (CRL-Resp) including CRL information for the UE certificate to the base station 5-15. Thereafter, the base station 5-15 may identify the CRL information for the UE certificate and identify whether the UE certificate has been revoked.

The base station 5-15 may identify the certificate of the UE 5-10, select an appropriate one among the cipher specs transmitted by the UE 5-10, specify the certificate of the UE 5-10 in the TLS change_cipher_spec, and transmit, to the UE 5-10, an authentication request message including TLS finished information (5-140). The authentication request message may include 6G KSI and ABBA information (5-140).

The UE 5-10 may transmit an empty authentication response message (Auth-Resp), as a message responsive to the authentication request message, to the base station 5-15 (5-150). The base station 5-15 uses the most significant 256 (128) bits of the generated EMSK, as the gNB key. The base station 5-15 may transmit an EAP Success message indicating normal authentication with the UE 5-10 (EAP success) and inducing a gNB key (5-160). When receiving the EAP Success, the UE 5-10 uses the most significant 256 (128) bits of the EMSK, as the gNB key, as does the base station 5-15.

Figure 6A:
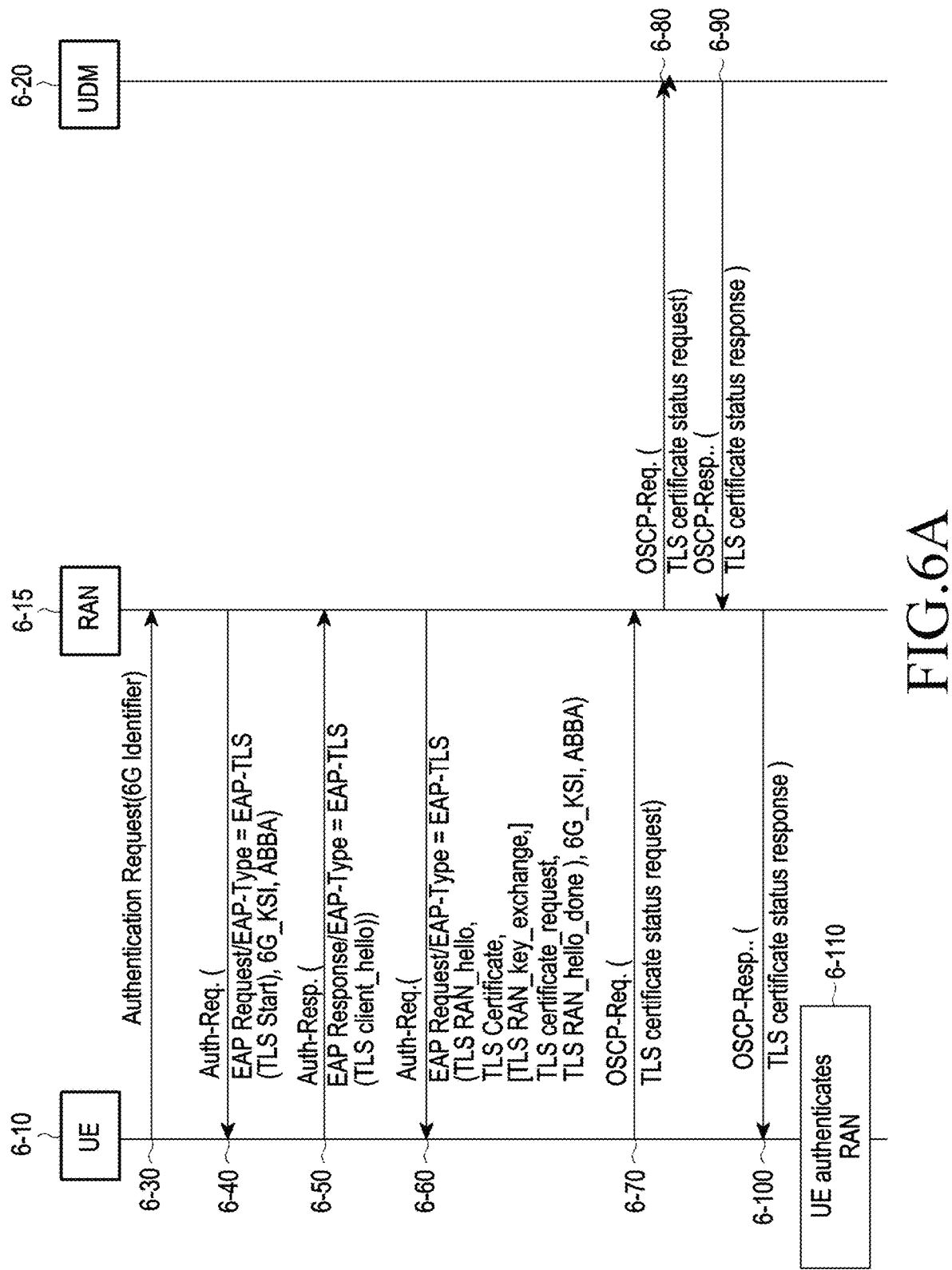
FIGS. 6A and 6B are views illustrating a procedure for identifying the validity of a certificate upon performing PKI-based authentication when a UE establishes a connection with a base station according to an embodiment.
Figure 6B:
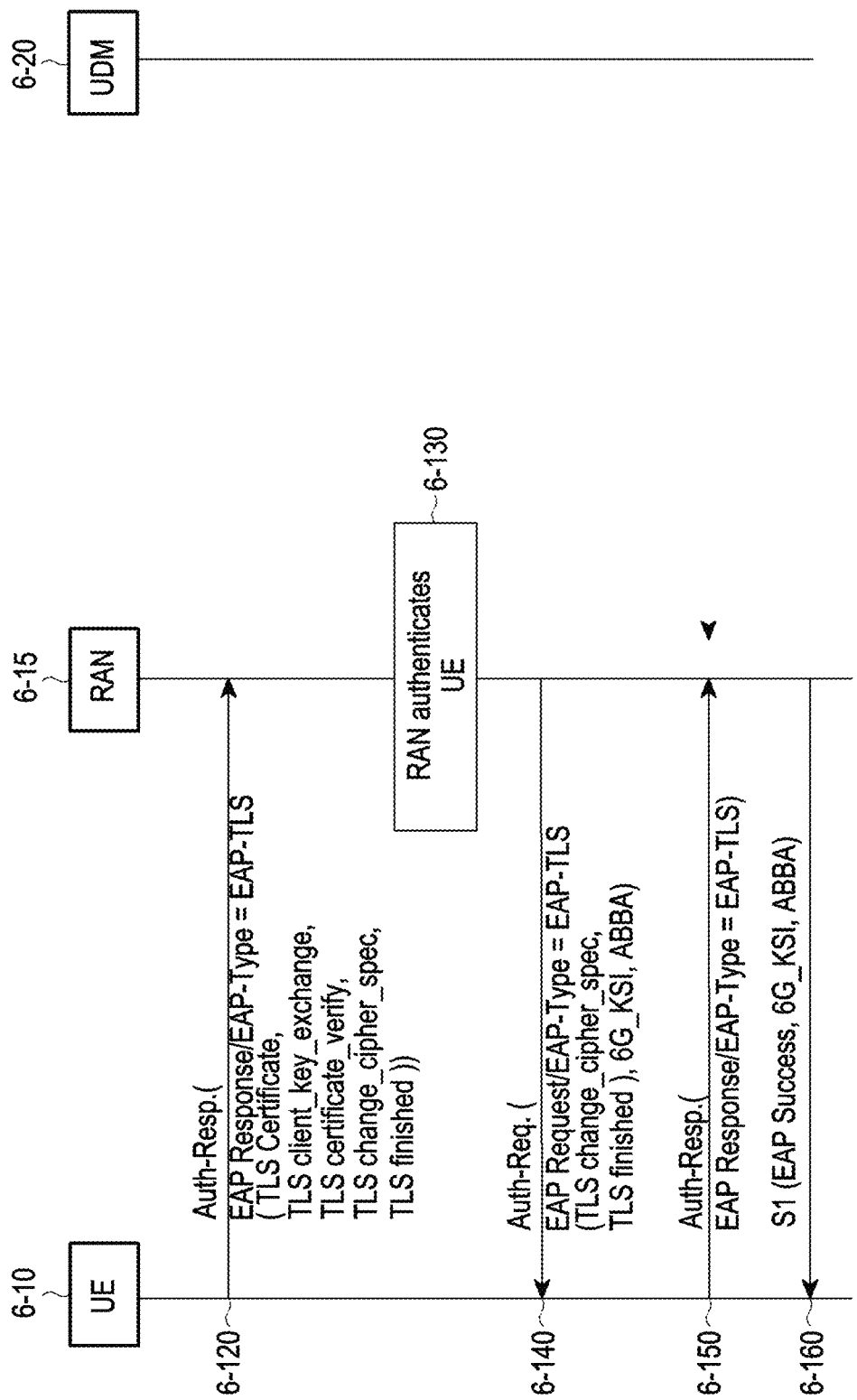

FIGS. 6A and 6B are views illustrating a procedure for identifying the validity of a certificate upon performing PKI-based authentication when a UE establishes a connection with a base station according to an embodiment.

FIGS. 6A and 6B illustrate a procedure for a UE to perform mutual authentication with a base station upon initial access to the base station or when the UE switches from an RRC idle mode or RRC inactive mode (or lightly-connected mode) to an RRC connected mode to connect to a network.

In the embodiment of FIGS. 6A and 6B, it may be identified whether a corresponding certificate (base station certificate or UE certificate) has been revoked through an online certificate status protocol (OCSP) during a mutual authentication process. In this case, since the case of the UE 6-10 is not in communication and is unable to send a request for OCSP to the CA, the base station 6-15 may perform a procedure for allowing communication for the OCSP request message (OCSP-Req) of the UE 6-10.

The UE 6-10 may transmit an authentication request message (Authentication Request) including its own 6G identifier to the base station 6-15 to access the base station 6-15 (6-30). After receiving the authentication request message of the UE 6-10, the base station 6-15 may transmit, to the UE 6-10, a message (Auth-Req.) for requesting authentication on the base station 6-15 with EAP-TLS (TLS start) (6-40).

The base station 6-15 may include, in the authentication request message (Auth-Req), a 6G key set identifier (6G_KSI), which is an identifier for the authentication, and an ABBA parameter for preventing a bidding-down of the security feature from the higher release to the lower release (6-40).

When the UE 6-10 receives the TLS start information from the base station 6-15, the UE 6-10 may transmit an authentication response message (Auth-Resp.) including TLS client_hello information to the base station 6-15 (6-50).

Upon receiving the TLS client_hello information included in the authentication response message (Auth-Resp.) of the UE 6-10, the base station 6-15 may transmit, to the UE 5-10, an authentication request message (Auth-Req.) including at least one of TLS RAN_hello, TLS certificate (base station certificate), TLS RAN_key_exchange, TLS certificate_request (whether a UE certificate is requested), TLS RAN_hello_done information, 6G KSI, and ABBA parameter (6-60). In this case, the base station 6-15 may verify the UE certificate by setting a certificate_request unless a TLS emergency call is used.

The UE 6-10 need verify the base station certificate included in the authentication request message of the base station 6-15. Since the base station certificate was legitimately signed by the CA but may have been revoked later, the UE 6-10 needs a check on whether the base station certificate has been revoked. In FIG. 6, the UE 6-10 may send a request for a response to the online certificate status protocol (OCSP), which is a protocol for real-time identifying whether the base station certificate is revoked, to the CA included in the certificate or the server designated by the CA for certificate verification.

To real-time identify, from the UDM 6-20, whether the corresponding base station certificate is revoked, the UE 6-10 may transmit an OCSP request message (OCSP-req (TLS certificate status request)) to the base station 6-15 (6-70).

Since the UE 6-10 has not been authenticated yet when the OCSP request message (OCSP-req) is received from the UE 6-10, the base station 6-15 is supposed to reject NAS communication of the UE 6-10 as default. However, the base station 6-15 may exceptionally allow transmission of the OCSP request message because it is not normal data communication.

The base station 6-15 may forward the OCSP request message (TLS certificate status request) to the NE, the UDM 6-20 in the illustrated example, serving as the CA of the base station certificate (6-80). In this process, the UE 6-10 may determine whether to forward the OCSP request message to a server, which is known to the base station 6-15 as serving as a CA, based on the message contained in the packets, e.g., the IP, or the current information for the UE.

The UDM 6-20 identifies the OCSP request message received from the UE 6-10 and may transmit, to the base station 6-15, an OCSP response message (OCSP-Resp) including the base station certificate status information (TLS certificate status response) requested by the UE 6-10 (6-90). The base station 6-15 may retransmit the OCSP response message (OCSP-Resp (TLS certificate status response)) to the UE 6-10 (6-100).

The UE 6-10 identifies the base station certificate included in the authentication request message of the base station 6-15, and performs authentication as to whether the base station certificate is a legitimate certificate (6-110).

After identifying that there is no abnormality in the certificate of the base station 6-15, the UE 6-10 may transmit, to the base station 6-15, an authentication response message (Auth-Resp.) including at least one of a TLS certificate (UE certificate), TLS client_key_exchange, TLS certificate_verify, TLS change_cipher_spec (possible chipper spec information), and TLS finish information (6-120).

According to an embodiment, a procedure for identifying whether the UE certificate has been revoked through the online certificate status protocol (OCSP) for the UE certificate may be performed between operations 6-120 and 6-130.

To real-time identify, from the UDM 6-20, whether the UE certificate is revoked, the base station 6-15 may send an OCSP request message (TLS certificate status request) for the UE certificate to the NE, the UDM 6-20 in the illustrated example, serving as the CA of the base station certificate. The UDM 6-20 may transmit an OCSP response message including the UE certificate status information (TLS certificate status response) requested by the base station 6-15 to the base station 6-15. Thereafter, the base station 6-15 may identify whether the UE certificate is revoked based on the UE certificate status response (TLS certificate status response).

After receiving the certificate of the UE 6-10, the base station 6-15 identifies the certificate of the UE 6-10 (6-130). The base station 6-15 may identify the certificate of the UE 6-10, select an appropriate one among the cipher specs transmitted by the UE 6-10, specify the certificate of the UE 6-10 in the TLS change_cipher_spec, and transmit, to the UE 6-10, an authentication response message (Auth-Resp) including TLS finished information (6-140). The authentication response message may also include 6G KSI and ABBA information (6-140). The UE 6-10 may transmit an empty Auth-Resp message to the base station as responsive thereto (6-150). The base station 6-15 uses the most significant 256 (128) bits of the generated EMSK, as the gNB key.

The base station 6-15 may transmit an EAP Success message indicating normal authentication with the UE 6-10 (EAP success) and inducing a gNB key (6-160). When receiving the EAP Success, the UE 6-10 uses the most significant 256 (128) bits of the EMSK, as the gNB key, as does the base station 6-15.

Figure 7A:
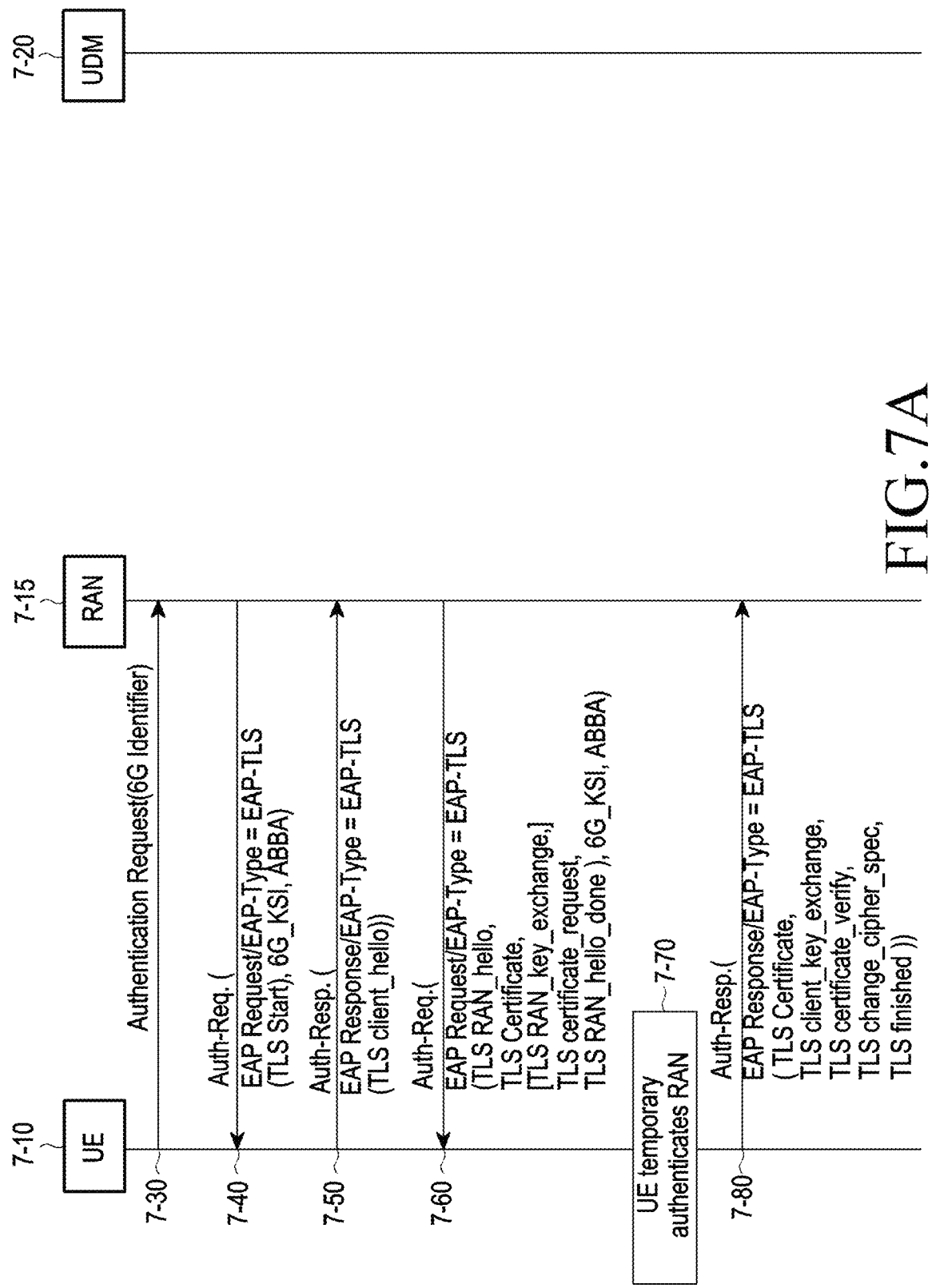
FIGS. 7A and 7B are views illustrating a procedure for identifying the validity of a certificate upon performing PKI-based authentication when a UE establishes a connection with a base station according to an embodiment.
Figure 7B:
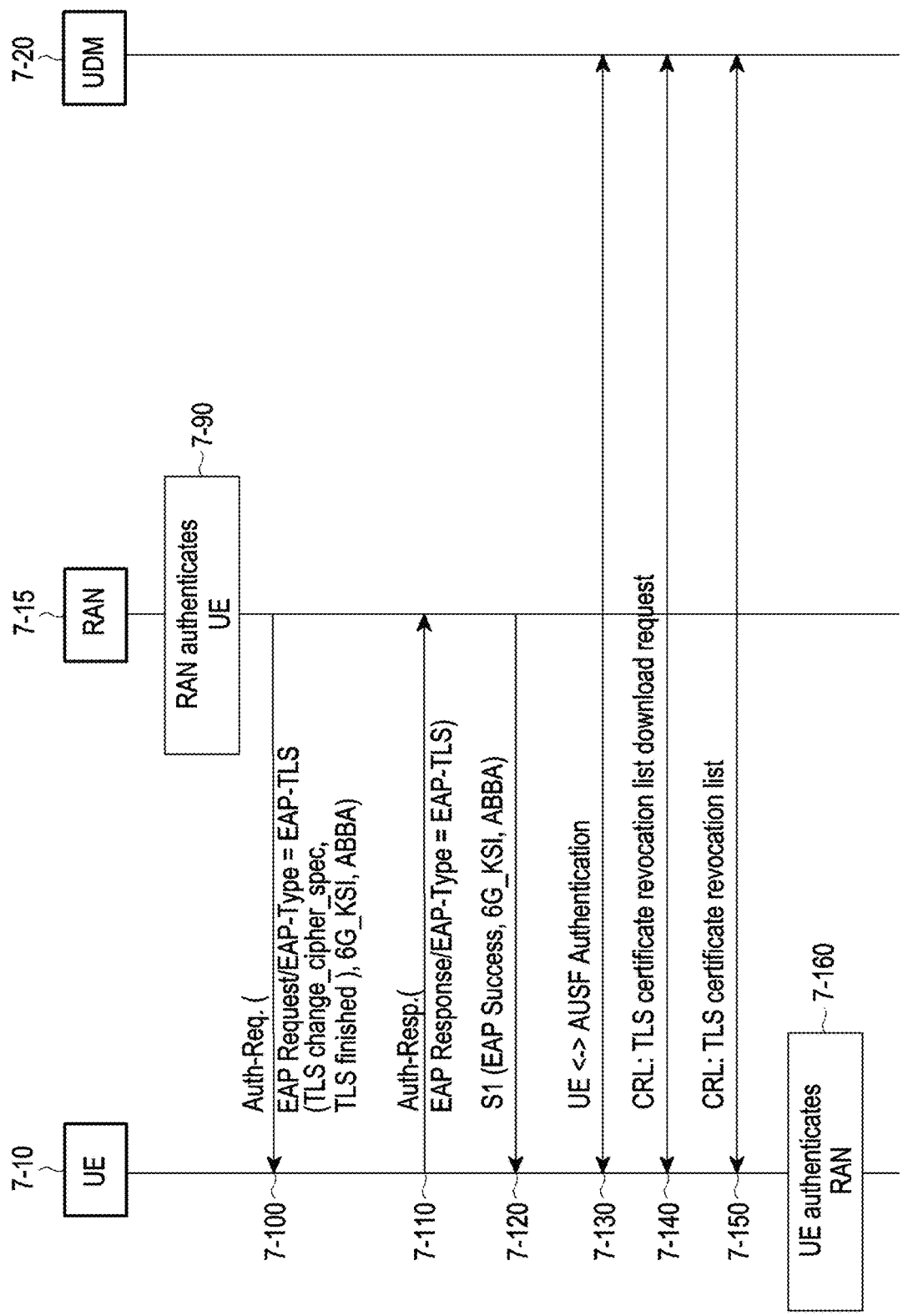

FIGS. 7A and 7B are views illustrating a procedure for identifying the validity of a certificate upon performing PKI-based authentication when a UE establishes a connection with a base station according to an embodiment.

FIGS. 7A and 7B illustrate a procedure for a UE to perform mutual authentication with a base station upon initial access to the base station or when the UE switches from an RRC idle mode or RRC inactive mode (or lightly-connected mode) to an RRC connected mode to connect to a network.

In the embodiment of FIGS. 7A and 7B, there is provided operations for downloading a credential revocation list (CRL) during a mutual authentication process and identifying whether the CRL includes a certificate of a corresponding base station. In this case, since the UE 7-10 does not communicate and is thus unable to send a request for the CRL to a network entity (e.g., a CA server), there is needed a procedure for the base station 7-15 to forward (or allow) the UE's CRL request message to the network.

While the UE and the UDM transmit/receive CRL request/response messages via the base station in operations 5-70 and 5-100 during mutual authentication in the embodiment of FIGS. 5A and 5B, the UE 7-10 and the UDM 7-20 directly transmit/receive CRL request/response messages in operations 7-140 and 7-150 after temporary mutual authentication between the UE 7-10 and the base station 7-15 in the embodiment of FIGS. 7A and 7B.

The UE 7-10 may first transmit an authentication request message (Authentication Request) including its own 6G identifier to the base station 7-15 to access the base station 7-15 (7-30).

After receiving the authentication request message of the UE 7-10, the base station 7-15 may transmit, to the UE 7-10, a message (Auth-Req.) for requesting authentication on the base station 7-15 with EAP-TLS (TLS start) (7-40).

The base station 7-15 may include, in the authentication request message (Auth-Req), a 6G key set identifier (6G_KSI), which is an identifier for the authentication, and an anti-bidding down between architectures (ABBA) parameter for preventing a bidding-down of the security feature from the higher release to the lower release, and transmit them to the UE 7-10 (7-40).

When the UE 7-10 receives the TLS start information from the base station 7-15, the UE 7-10 may transmit an authentication response message (Auth-Resp.) including TLS client_hello information to the base station 7-15 (7-50).

Upon receiving the TLS client_hello information included in the authentication response message (Auth-Resp.) of the UE 7-10, the base station 7-15 may transmit, to the UE 7-10, an authentication request message (Auth-Req.) including at least one of TLS RAN_hello, TLS certificate (base station certificate), TLS RAN_key_exchange, TLS certificate_request (whether a UE certificate is requested), TLS RAN_hello_done information, 6G KSI, and ABBA parameter (7-60).

In this case, the base station 7-15 may verify the UE certificate by setting a certificate_request unless a TLS emergency call is used. The UE 7-10 need verify the base station certificate included in the authentication request message of the base station 7-15. Since the base station certificate was legitimately signed by the CA but may have been revoked later, the UE 7-10 needs a check.

Therefore, the UE 7-10 is required to receive a credential revocation list (CRL) that records whether the base station certificate has been revoked from the CA included in the base station certificate or a server designated by the CA for certificate verification. However, since the UE 7-10 is not yet authenticated, the UE 7-10 is incapable of both AS communication and NAS communication.

The UE 7-10 may temporarily perform authentication only with the base station certificate without verifying whether the certificate is revoked (7-70). After identifying that there is no abnormality in the certificate of the base station 7-15, the UE 7-10 may transmit, to the base station 7-15, an authentication response message including a TLS certificate (UE certificate), TLS client_key_exchange, TLS certificate_verify, TLS change_cipher_spec (possible chipper spec information), and TLS finish information, in response thereto (7-80).

After receiving the certificate of the UE 7-10, the base station 7-15 identifies the certificate of the UE 7-10 (7-90). The base station 7-15 may identify the certificate of the UE 7-10, select an appropriate one among the cipher specs transmitted by the UE 7-10, specify the certificate of the UE 7-10 in the TLS change_cipher_spec, and transmit an authentication request message including TLS finished information (7-100). The authentication request message may also include 6G KSI and ABBA information (7-100). The UE 7-10 may transmit an empty Auth-Resp message to the base station 7-15 as responsive thereto (7-110). The base station 7-15 uses the most significant 256 (128) bits of the generated EMSK, as the gNB key. The base station 7-15 may transmit an EAP Success message indicating normal authentication with the UE 7-10 (EAP success) and inducing a gNB key (7-120). When receiving the EAP Success, the UE 7-10 uses the most significant 256 (128) bits of the EMSK, as the gNB key, as does the base station 7-15.

The UE 7-10 may then perform authentication between the core network and the UE for NAS communication (7-130).

The UE 7-10 may verify whether the temporarily authenticated base station certificate is revoked after NAS communication is performed. The UE 7-10 may transmit a CRL request message (CRL-req) for the base station certificate to the UDM 7-20 (7-140). The UDM 7-20 may identify the CRL request message (CRL-Req) received from the UE 7-10 and transmit CRL information for the base station certificate requested by the UE 7-10 to the UE 7-10 (7-160).

Thereafter, the UE 7-10 may identify whether there is the base station certificate in the authentication request message of the base station 7-15, and perform authentication as to whether the base station certificate is a legitimate certificate (7-160).

According to an embodiment, the base station 7-15 may transmit a CRL request message (CRL-req) for the UE certificate to the UDM 7-20. The UDM 7-20 may identify the CRL request message (CRL-Req) for the UE certificate and transmit CRL information for the base station certificate requested by the base station 7-15 to the base station 7-15.

Figure 8B:
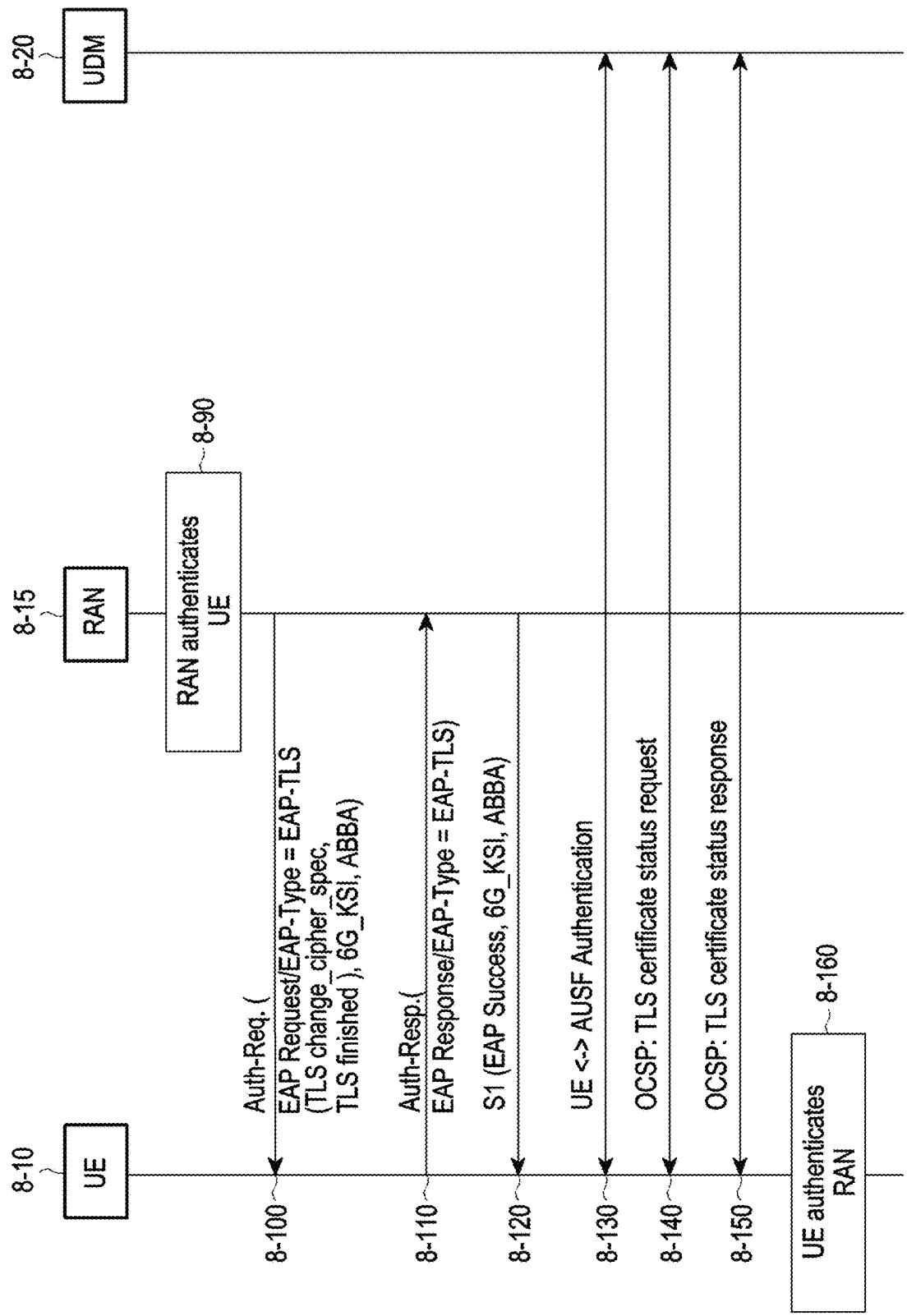

FIGS. 8A and 8B are views illustrating a procedure for identifying the validity of a certificate upon performing PKI-based authentication when a UE establishes a connection with a base station according to an embodiment.

FIGS. 8A and 8B illustrate a procedure for a UE to perform mutual authentication with a base station upon initial access to the base station or when the UE switches from an RRC idle mode or RRC inactive mode (or lightly-connected mode) to an RRC connected mode to connect to a network.

In the embodiment of FIGS. 8A and 8B, during the mutual authentication process, the UE 8-10 needs to identify whether the certificate of the base station 8-15 is revoked through an online certificate status protocol (OCSP). However, since the UE 8-10 is not in communication and is unable to send a request for OCSP to the CA, the UE 8-10 may temporarily identify only the base station certificate and, after NAS authentication is finished, the UE 7-10 may perform verification as to whether the base station certificate is revoked.

While the UE and the UDM transmit/receive OCSP request/response messages via the base station in operations 6-70 and 6-100 during mutual authentication in the embodiment of FIGS. 6A and 6B, the UE 8-10 and the UDM 8-20 directly transmit/receive OCSP request/response messages in operations 8-140 and 8-150 after temporary mutual authentication between the UE 8-10 and the base station 8-15 in the embodiment of FIGS. 8A and 8B.

The UE 8-10 may first transmit an authentication request message (authentication request) including its own 6G identifier to the base station 8-15 to access the base station 8-15 (8-30).

After receiving the authentication request message of the UE 8-10, the base station 8-15 may transmit, to the UE 8-10, a message (Auth-Req.) for requesting authentication on the base station 8-15 with EAP-TLS (TLS start) (8-40). The base station 8-15 may include, in the authentication request message (Auth-Req), a 6G key set identifier (6G_KSI), which is an identifier for the authentication, and an anti-bidding down between architectures (ABBA) parameter for preventing a bidding-down of the security feature from the higher release to the lower release, and transmit them to the UE 8-10 (8-40).

When the UE 8-10 receives the TLS start information from the base station 8-15, the UE 8-10 may transmit an authentication response message (Auth-Resp.) including TLS client_hello information to the base station 8-15 (8-50).

Upon receiving the TLS client_hello information included in the authentication response message (Auth-Resp.) of the UE 8-10, the base station 8-15 may transmit, to the UE 8-10, an authentication request message (Auth-Req.) including at least one of TLS RAN_hello, TLS certificate (base station certificate), TLS RAN_key_exchange, TLS certificate_request (whether a UE certificate is requested), TLS RAN_hello_done information, 6G KSI, and ABBA parameter (8-60).

In this case, the base station 8-15 may verify the UE certificate by setting a certificate_request unless a TLS emergency call is used. The UE 8-10 need verify the base station certificate included in the authentication request message of the base station 8-15.

Since the base station certificate was legitimately signed by the CA but may have been revoked later, the UE 8-10 needs a check on whether the base station certificate has been revoked. Therefore, the UE 8-10 needs to receive an OCSP for notifying in real time whether the corresponding base station certificate has been revoked, from the CA included in the certificate or the server designated by the CA for certificate verification.

However, since the UE 8-10 has not yet been authenticated and is thus incapable of both AS communication and NAS communication, the UE 8-10 may temporarily perform authentication only with the base station certificate without verifying whether the certificate is revoked (8-70).

After identifying that there is no abnormality in the certificate of the base station 8-15, the UE 8-10 may transmit, to the base station 8-15, an authentication response message including a TLS certificate (UE certificate), TLS client_key_exchange, TLS certificate_verify, TLS change_cipher_spec (possible chipper spec information), and TLS finish information, in response thereto (8-80).

After receiving the certificate of the UE 8-10, the base station 8-15 identifies the certificate of the UE 8-10 (8-90). The base station 8-15 may identify the certificate of the UE 8-10, select an appropriate one among the cipher specs transmitted by the UE 8-10, specify the certificate of the UE 8-10 in the TLS change_cipher_spec, and transmit, to the UE 8-10, an authentication response message including TLS finished information (8-100). The authentication response message may also include 6G KSI and ABBA information (8-100).

The UE 8-10 may transmit an empty Auth-Resp message to the base station 8-15 as responsive thereto (8-110). The base station 8-15 uses the most significant 256 (128) bits of the generated EMSK, as the gNB key.

The base station 8-15 may transmit an EAP Success message indicating normal authentication with the UE 8-10 and inducing a gNB key (8-120). When receiving the EAP Success, the UE 8-10 uses the most significant 256 (128) bits of the EMSK, as the gNB key, as does the base station 8-15.

Thereafter, the UE 8-10 performs authentication between the core network and the UE for NAS communication (8-130). The UE 8-10 verifies whether the temporarily authenticated certificate is revoked after NAS communication is performed. To that end, the UE 8-10 may transmit an OCSP request message (OCSP-req) for the base station certificate to the UDM 8-20 (8-140). The UDM 8-20 may identify the OCSP request message (OCSP-Req) received from the UE 8-10 and transmit an OCSP response message (OCSP-Resp) including OCSP information requested by the UE 8-10 to the UE 8-10 (8-150).

The UE 8-10 identifies whether the certificate of the base station 8-15 is revoked based on the OCSP response message and performs authentication as to whether the base station certificate is a legitimate certificate (8-160).

According to an embodiment, the base station 8-15 may transmit an OCSP request message (OCSP-req) for the UE certificate to the UDM 8-20. The UDM 8-20 may identify the OCSP request message (OCSP-Req) for the UE certificate and transmit OCSP information for the UE certificate requested by the base station 8-15 to the base station 8-15.

Figure 9:
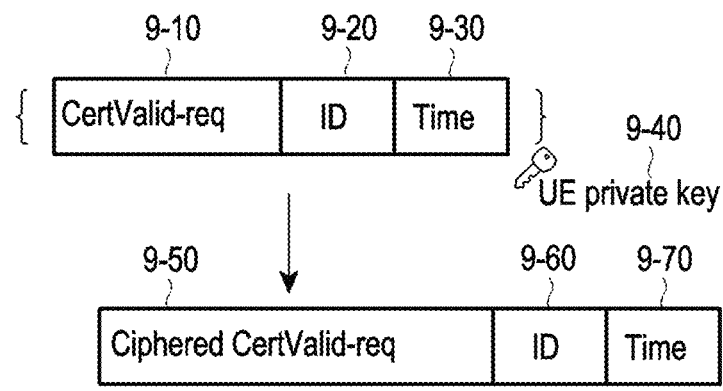
FIG. 9 is a view illustrating an example in which a UE applies an encryption technique to prevent tampering of a certificate validity request message according to an embodiment.

FIG. 9 is a view illustrating an example in which a UE applies an encryption technique to prevent tampering of a certificate validity request message according to an embodiment.

FIG. 9 illustrates an encryption method for providing confidentiality for a message when a UE transmits the message for identifying certificate revocation to a CA. In the authentication procedure for the UE to receive a mobile communication service, that is, in the procedure for the UE and the base station to authenticate each other, it is necessary to identify whether the certificate is revoked through an unauthenticated base station before the mutual authentication. In this case, the message for identifying whether the certificate is revoked needs to be protected by being encrypted.

Referring to FIG. 9, a message (CertValid-req) 9-10 for identifying whether the certificate is revoked, an ID 9-20, a time 9-30, and a UE private key 9-40 are shown.

The message (CertValid-req) 9-10 for identifying whether the certificate is revoked means a message sent by the UE to the UDM to identify whether the certificate is revoked in the procedures illustrated in FIGS. 4 to 8. As an example, the message means a communication message, such as of the CRL or OCSP, but without limitations thereto, may include any communication message by which it may be identified whether the certificate is revoked.

The ID 9-20 or 9-60 means the identifier of the entity sending the message of CertValid-req 9-10. As the ID is included in the encrypted information, the UDM may identify that the message was created by the sender without tampering by a hacker.

The time 9-30 or 9-70 means time information for transmission of the message. As the time is included in the encrypted information, a hacker's replay attack using the message may be prevented. The time format may be expressed in coordinated universal time (UTC) or an offset of UTC, but is not limited only to UTC.

The Ciphered CertValid-req 9-50 is a message obtained by encrypting a message including the CertValid-req 9-10, the ID 9-20, and the time 9-30 with the UE's private key 9-40.

According to an embodiment, a message including the ciphered CertValid-req 9-50, ID 9-20, and time 9-30 may be generated, protecting the message indicating whether the certificate is revoked. According to another embodiment, a message including a ciphered CertValid-req 9-50 and an ID 9-20 may be generated to protect the message indicating whether the certificate is revoked. According to another embodiment, a message including a ciphered CertValid-req 9-50 and a time 9-30 may be generated to protect the message indicating whether the certificate is revoked.

Figure 10:
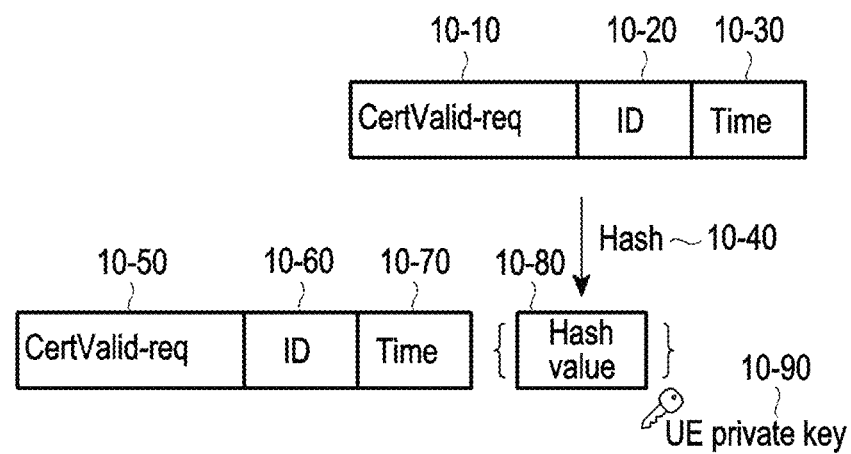
FIG. 10 is a view illustrating an example in which a UE applies an encryption technique to prevent tampering of a certificate validity request message according to an embodiment.

FIG. 10 is a view illustrating an example in which a UE applies an encryption technique to prevent tampering of a certificate validity request message according to an embodiment.

FIG. 10 illustrates an encryption method for providing integrity for a message when a UE transmits the message for identifying certificate revocation to a CA. In an authentication procedure for the UE to receive a mobile communication service, specifically, a procedure for the UE and the base station to authenticate each other, before the base station is authenticated, it needs to be identified whether the certificate is revoked via an unauthorized base station, and a message for identifying authentication needs to be encrypted and protected.

Referring to FIG. 10, a message (CertValid-req) 10-10 for identifying whether the certificate is revoked, an ID 10-20, a time 10-30, and a UE private key 10-90 are shown.

The message (CertValid-req) 10-10 for identifying whether the certificate is revoked means a message sent by the UE to the UDM to identify whether the certificate is revoked in the above-described procedures. As an example, the message (CertValid-req) 10-10 for identifying whether the certificate is revoked means a communication message, such as of the CRL or OCSP, but without limitations thereto, may include any communication message by which it may be identified whether the certificate is revoked.

The ID 10-20 or 10-60 means the identifier of the entity sending the message of CertValid-req 10-10. As the ID is included in the encrypted information, the UDM may identify that the message was created by the sender without tampering by a hacker.

The time 10-30 or 10-70 means time information for transmission of the message. As the time is included in the encrypted information, a hacker's replay attack using the message may be prevented. The time format may be expressed in coordinated universal time (UTC) or an offset of UTC, but is not limited only to UTC.

A Hash value 10-80 is a value obtained by calculating a message including at least one of the ID 10-20 and the time 10-30 and CertValid-req 10-10, by a hash function.

In FIG. 10, a message including a value obtained by encrypting at least one of the ID 10-20 and the time 10-30, the CertValid-req 10-10, and the Hash value with the UE private key 10-90 may be generated, protecting the message for identifying whether the certificate is revoked.

Figure 11:
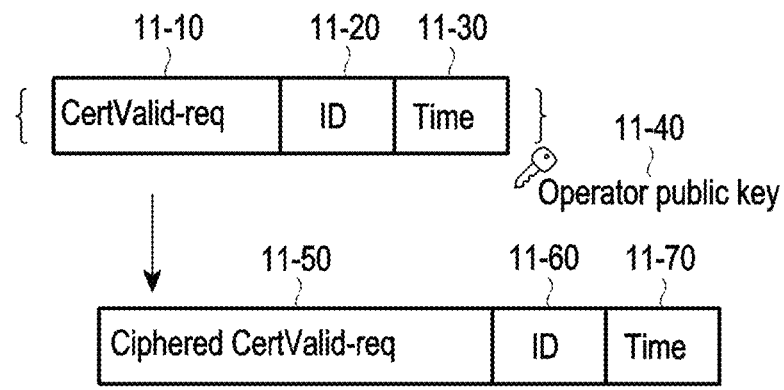
FIG. 11 is a view illustrating an example in which a UE applies an encryption technique to prevent tampering of a certificate validity request message according to an embodiment.

FIG. 11 is a view illustrating an example in which a UE applies an encryption technique to prevent tampering of a certificate validity request message according to an embodiment.

FIG. 11 illustrates an encryption method for providing confidentiality for a message when a UE transmits the message for identifying certificate revocation to a CA. In an authentication procedure for the UE to receive a mobile communication service, specifically, a procedure for the UE and the base station to authenticate each other, before the base station is authenticated, it needs to be identified whether the certificate is revoked via an unauthorized base station, and a message for identifying whether the certificate is revoked needs to be encrypted and protected.

Referring to FIG. 11, a message (CertValid-req) 11-10 for identifying whether the certificate is revoked, an ID 11-20, a time 11-30, and an operator public key 11-40 are shown.

The message (CertValid-req) 11-10 for identifying whether the certificate is revoked means a message sent by the UE to the UDM to identify whether the certificate is revoked. As an example, the message (CertValid-req) 11-10 for identifying whether the certificate is revoked means a communication message, such as of the CRL or OCSP, but without limitations thereto, may include any communication message by which it may be identified whether the certificate is revoked.

The ID 11-20 or 11-60 denotes the entity sending the message of CertValid-req 11-10. As the ID is included in the encrypted information, the UDM may identify that the message was created by the sender without tampering by a hacker.

The time 11-30 or 11-70 means time information for transmission of the message. As the time is included in the encrypted information, a hacker's replay attack using the message may be prevented. The time format may be expressed in coordinated universal time (UTC) or an offset of UTC, but is not limited only to UTC.

The Ciphered CertValid-req 11-50 is a message obtained by encrypting a message including at least one of the ID 3-20 and the time 11-30 and the CertValid-req 11-10 with the operator public key 11-40.

In FIG. 11, a message including at least one of the ID 11-20 and the time 11-30 and the ciphered CertValid-req 11-50 may be generated, protecting the message for identifying whether the certificate is revoked.

Figure 12:
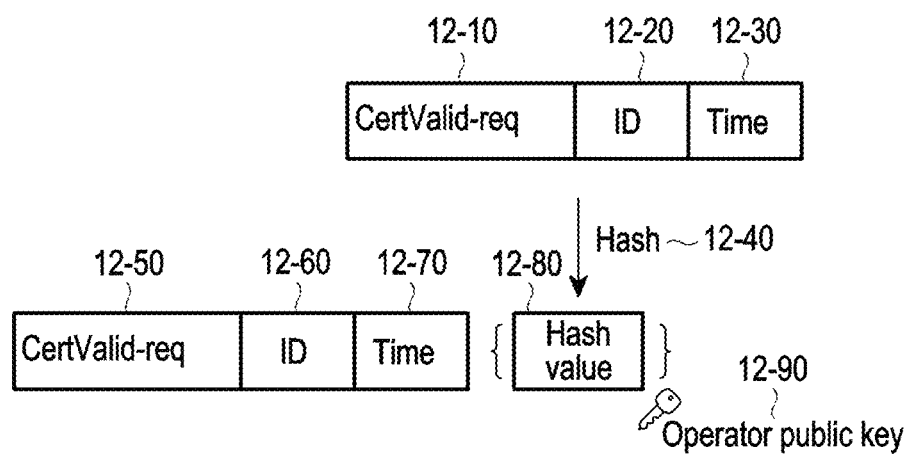
FIG. 12 is a view illustrating an example in which a UE applies an encryption technique to prevent tampering of a certificate validity request message according to an embodiment.

FIG. 12 is a view illustrating an example in which a UE applies an encryption technique to prevent tampering of a certificate validity request message according to an embodiment.

FIG. 12 illustrates an encryption method for providing integrity for a message when a UE transmits the message for identifying certificate revocation to a CA. In an authentication procedure for the UE to receive a mobile communication service, specifically, a procedure for the UE and the base station to authenticate each other, before the base station is authenticated, it needs to be identified whether the certificate is revoked via an unauthorized base station, and thus, a message for identifying whether the certificate is revoked needs to be encrypted and protected.

Referring to FIG. 12, a message (CertValid-req) 12-10 for identifying whether the certificate is revoked, an ID 12-20, a time 12-30, and an operator public key 12-90 are shown.

The message (CertValid-req) 12-10 for identifying whether the certificate is revoked means a message sent by the UE to the UDM to identify whether the certificate is revoked in the above-described procedures. As an example, the message (CertValid-req) 12-10 for identifying whether the certificate is revoked means a communication message, such as of the CRL or OCSP, but without limitations thereto, may include any communication message by which it may be identified whether the certificate is revoked.

The ID 12-20 or 12-60 denotes the entity sending the message of CertValid-req 12-10. As the ID is included in the encrypted information, the UDM may identify that the message was created by the sender without tampering by a hacker.

The time 12-30 or 12-70 means time information for transmission of the message. As the time is included in the encrypted information, a hacker's replay attack using the message may be prevented. The time format may be expressed in coordinated universal time (UTC) or an offset of UTC, but is not limited only to UTC.

A Hash value 12-80 is a value obtained by calculating a message including at least one of the ID 12-20 and the time 12-30 and CertValid-req 12-10, by a hash function.

In the embodiment of FIG. 12, a message including a value obtained by encrypting at least one of the CertValid-req 12-10, ID 12-20, and time 12-30 and the Hash value with the operator public key 12-90 may be generated, protecting the message for identifying whether the certificate is revoked.

Figure 13:
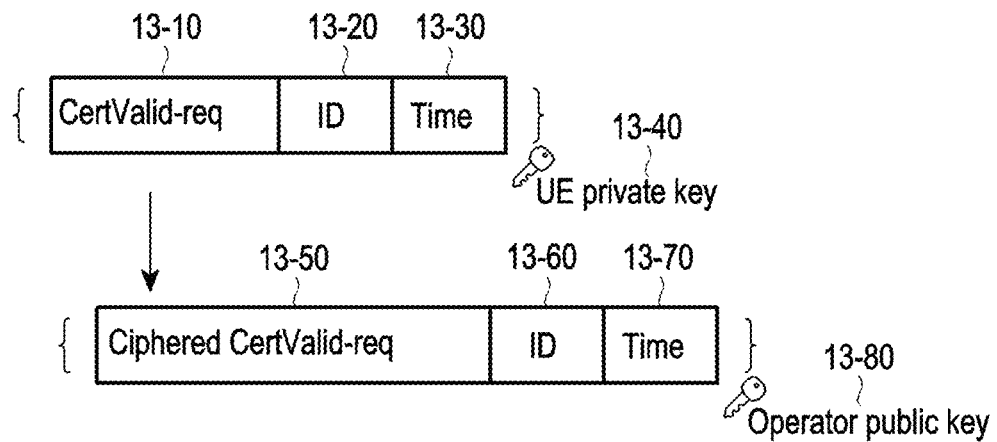
FIG. 13 is a view illustrating an example in which a UE applies an encryption technique to prevent tampering of a certificate validity request message according to an embodiment.

FIG. 13 is a view illustrating an example in which a UE applies an encryption technique to prevent tampering of a certificate validity request message according to an embodiment.

FIG. 13 illustrates an encryption method for providing integrity and confidentiality for a message when a UE transmits the message for identifying certificate revocation to a CA.

In an authentication procedure for the UE to receive a mobile communication service, specifically, a procedure for the UE and the base station to authenticate each other, before the base station is authenticated, it needs to be identified whether the certificate is revoked via an unauthorized base station, and thus, a message for identifying whether the certificate is revoked needs to be encrypted and protected.

Referring to FIG. 13, a message (CertValid-req) 13-10 for identifying whether the certificate is revoked, an ID 13-20, a time 13-30, a UE private key 13-40, and an operator public key 13-80 are shown.

The message (CertValid-req) 13-10 for identifying whether the certificate is revoked means a message sent by the UE to the UDM to identify whether the certificate is revoked in the above-described procedures. As an example, the message (CertValid-req) 13-10 for identifying whether the certificate is revoked means a communication message, such as of the CRL or OCSP, but without limitations thereto, may include any communication message by which it may be identified whether the certificate is revoked.

The ID 13-20 or 13-60 denotes the entity sending the message of CertValid-req 13-10. As the ID is included in the encrypted information, the UDM may identify that the message was created by the sender without tampering by a hacker.

The time 13-30 or 13-70 means time information for transmission of the message. As the time is included in the encrypted information, a hacker's replay attack using the message may be prevented. The time format may be expressed in coordinated universal time (UTC) or an offset of UTC, but is not limited only to UTC.

The ciphered CertValid-req 13-50 is a message obtained by encrypting a message including at least one of the ID 13-20 and the time 13-30 and the CertValid-req 13-10 with the UE private key 13-40.

In the embodiment of FIG. 13, a message obtained by re-encrypting the message including at least one of the ID 13-20 and the time 13-30 and the ciphered CertValid-req 13-50 with the operator public key 13-80 may be generated, protecting the message for identifying whether the certificate is revoked.

Figure 14:
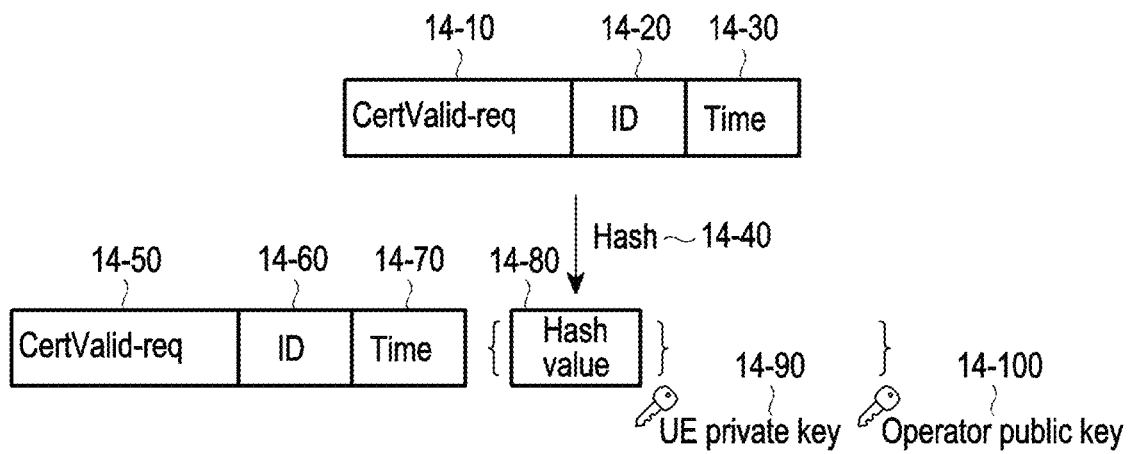
FIG. 14 is a view illustrating an example in which a UE applies an encryption technique to prevent tampering of a certificate validity request message according to an embodiment.

FIG. 14 is a view illustrating an example in which a UE applies an encryption technique to prevent tampering of a certificate validity request message according to an embodiment.

FIG. 14 illustrates an encryption method for providing integrity and confidentiality for a message when a UE transmits the message for identifying certificate revocation to a CA.

In an authentication procedure for the UE to receive a mobile communication service, specifically, a procedure for the UE and the base station to authenticate each other, before the base station is authenticated, it needs to be identified whether the certificate is revoked via an unauthorized base station, and thus, a message for identifying whether the certificate is revoked needs to be encrypted and protected.

Referring to FIG. 14, a message (CertValid-req) 14-10 for identifying whether the certificate is revoked, an ID 14-20, a time 14-30, a UE private key 14-90, and an operator public key 14-100 are shown.

The message (CertValid-req) 14-10 for identifying whether the certificate is revoked means a message sent by the UE to the UDM to identify whether the certificate is revoked in the above-described procedures. As an example, the message (CertValid-req) 14-10 for identifying whether the certificate is revoked means a communication message, such as of the CRL or OCSP, but without limitations thereto, may include any communication message by which it may be identified whether the certificate is revoked.

The ID 14-20 or 14-60 denotes the entity sending the message of CertValid-req 14-10. As the ID is included in the encrypted information, the UDM may identify that the message was created by the sender without tampering by a hacker.

The time 14-30 or 14-70 means time information for transmission of the message. As the time is included in the encrypted information, a hacker's replay attack using the message may be prevented. The time format may be expressed in coordinated universal time (UTC) or an offset of UTC, but is not limited only to UTC.

A Hash value 14-80 is a value obtained by calculating a message including at least one of the ID 14-20 and the Time 14-30 and CertValid-req 14-10, by a hash function.

In the embodiment of FIG. 14, a message obtained by encrypting, with the operator public key 14-100, the whole including the value obtained by encrypting at least one of the CertValid-req 14-20, ID 14-20, and time 14-30 and the hash value 14-80 with the UE private key 14-90, may be generated, protecting the message for identifying whether the certificate is revoked.

Figure 15:
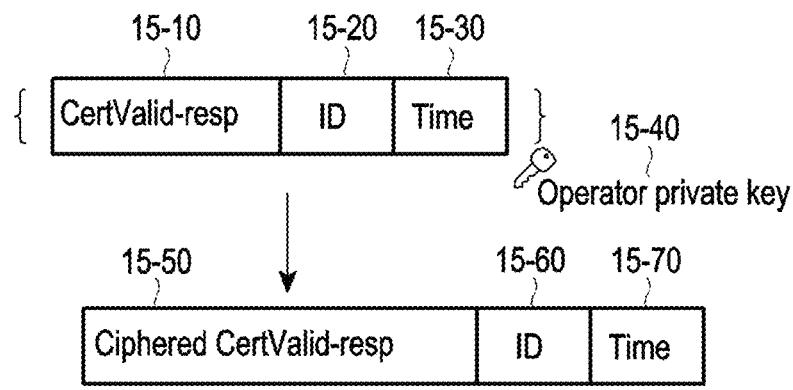
FIG. 15 is a view illustrating an example in which a UE applies an encryption technique to prevent tampering of a certificate validity response message according to an embodiment.

FIG. 15 is a view illustrating an example in which a UE applies an encryption technique to prevent tampering of a certificate validity response message according to an embodiment.

FIG. 15 illustrates an encryption method for providing confidentiality for a message when a certificate revocation response message is transmitted to a UE.

In an authentication procedure for the UE to receive a mobile communication service, specifically, a procedure for the UE and the base station to authenticate each other, before the base station is authenticated, it needs to be identified whether the certificate is revoked via an unauthorized base station, and thus, a message for identifying whether the certificate is revoked needs to be encrypted and protected.

Referring to FIG. 15, a message (CertValid-resp) 15-10 for responding to whether the certificate is revoked, an ID 15-20, a time 15-30, and an operator private key 15-40 are shown.

The message (CertValid-resp) 15-10 for responding to whether the certificate is revoked means a message for the CA to send, to the UE, information about whether the certificate is revoked. As an example, the message (CertValid-resp) 15-10 for whether the response the certificate is revoked means a communication message, such as of the CRL or OCSP, but without limitations thereto, may include any message responsive to a communication message by which it may be identified whether the certificate is revoked.

The ID 15-20 or 15-60 denotes the entity sending the message of CertValid-resp 15-10. As the ID is included in the encrypted information, the UE may identify that the message of the UDM was created by the sender without tampering by a hacker.

The time 15-30 or 15-70 means time information for transmission of the message. As the time is included in the encrypted information, a hacker's replay attack using the message may be prevented. The time format may be expressed in coordinated universal time (UTC) or an offset of UTC, but is not limited only to UTC.

The Ciphered CertValid-resp 15-50 is a message obtained by encrypting a message including at least one of the ID 15-20 and the time 15-30 and the CertValid-resp 15-10 with the operator private key 15-40.

In the embodiment of FIG. 15, a message including at least one of the ID 15-20 and the time 15-30 and the ciphered CertValid-resp 15-50 may be generated, protecting the message for identifying whether the certificate is revoked.

Figure 16:
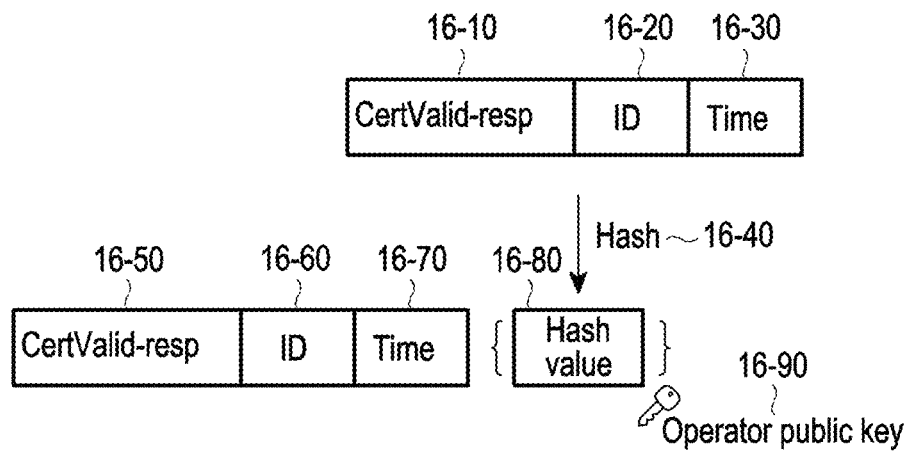
FIG. 16 is a view illustrating an example in which a UE applies an encryption technique to prevent tampering of a certificate validity response message according to an embodiment.

FIG. 16 is a view illustrating an example in which a UE applies an encryption technique to prevent tampering of a certificate validity response message according to an embodiment.

FIG. 16 illustrates an encryption method for providing confidentiality for a message when a certificate revocation response message is transmitted to a UE.

In an authentication procedure for the UE to receive a mobile communication service, specifically, a procedure for the UE and the base station to authenticate each other, before the base station is authenticated, it needs to be identified whether the certificate is revoked via an unauthorized base station, and thus, a message for identifying whether the certificate is revoked needs to be encrypted and protected.

Referring to FIG. 16, a message (CertValid-resp) 16-10 for responding to whether the certificate is revoked, an ID 16-20, a time 16-30, and an operator private key 16-90 are shown.

The message (CertValid-resp) 16-10 for responding to whether the certificate is revoked means a message for the CA to send, to the UE, information about whether the certificate is revoked. As an example, the message (CertValid-resp) 16-10 for whether the response the certificate is revoked means a communication message, such as of the CRL or OCSP, but without limitations thereto, may include any message responsive to a communication message by which it may be identified whether the certificate is revoked.

The ID 16-20 or 16-60 denotes the entity sending the message of CertValid-resp 16-10. As the ID is included in the encrypted information, the UDM may identify that the message was created by the sender without tampering by a hacker.

The time 16-30 or 16-70 means time information for transmission of the message. As the time is included in the encrypted information, a hacker's replay attack using the message may be prevented. The time format may be expressed in coordinated universal time (UTC) or an offset of UTC, but is not limited only to UTC.

A Hash value 16-80 is a value obtained by calculating a message including at least one of the ID 16-20 and the time 16-30 and CertValid-resp 16-10, by a hash function.

In the embodiment of FIG. 16, a message including a value obtained by encrypting at least one of the CertValid-resp 16-10, ID 16-20, and time 16-30 and the Hash value with the operator private key 16-90 may be generated, protecting the message for identifying whether the certificate is revoked.

Figure 17:
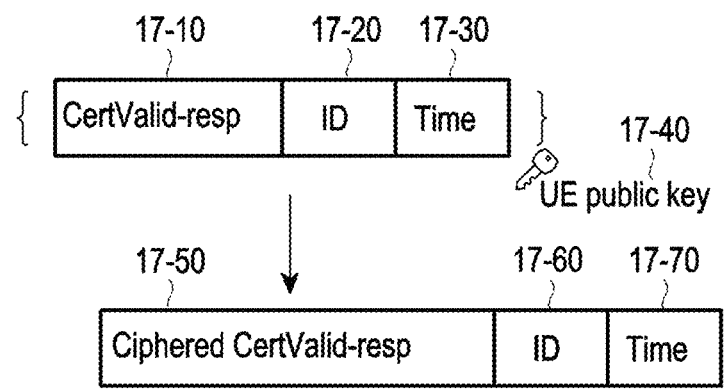
FIG. 17 is a view illustrating an example in which a UE applies an encryption technique to prevent tampering of a certificate validity response message according to an embodiment.

FIG. 17 is a view illustrating an example in which a UE applies an encryption technique to prevent tampering of a certificate validity response message according to an embodiment.

FIG. 17 illustrates an encryption method for providing confidentiality for a message when a certificate revocation response message is transmitted to a UE.

In an authentication procedure for the UE to receive a mobile communication service, specifically, a procedure for the UE and the base station to authenticate each other, before the base station is authenticated, it needs to be identified whether the certificate is revoked via an unauthorized base station, and thus, a message for identifying whether the certificate is revoked needs to be encrypted and protected.

Referring to FIG. 17, a message (CertValid-resp) 17-10 for responding to whether the certificate is revoked, an ID 17-20, a time 17-30, and a UE public Key 17-40 are shown.

The message (CertValid-resp) 17-10 for responding to whether the certificate is revoked means a message for the CA to send, to the UE, information about whether the certificate is revoked. As an example, the message (CertValid-resp) 17-10 for whether the response the certificate is revoked means a communication message, such as of the CRL or OCSP, but without limitations thereto, may include any message responsive to a communication message by which it may be identified whether the certificate is revoked.

The ID 17-20 or 17-60 denotes the entity sending the message of CertValid-resp 17-10. As the ID is included in the encrypted information, the UE may identify that the message of the UDM was created by the sender without tampering by a hacker.

The time 17-30 or 17-70 means time information for transmission of the message. As the time is included in the encrypted information, a hacker's replay attack using the message may be prevented. The time format may be expressed in coordinated universal time (UTC) or an offset of UTC, but is not limited only to UTC.

The Ciphered CertValid-req 17-50 is a message obtained by encrypting a message including at least one of the ID 17-20 and the time 17-30 and the CertValid-req 17-10 with the UE public key 17-40.

In the embodiment of FIG. 17, a message including at least one of the ID 17-20 and the time 17-30 and the ciphered CertValid-req 17-50 may be generated, protecting the message for responding to whether the certificate is revoked.

Figure 18:
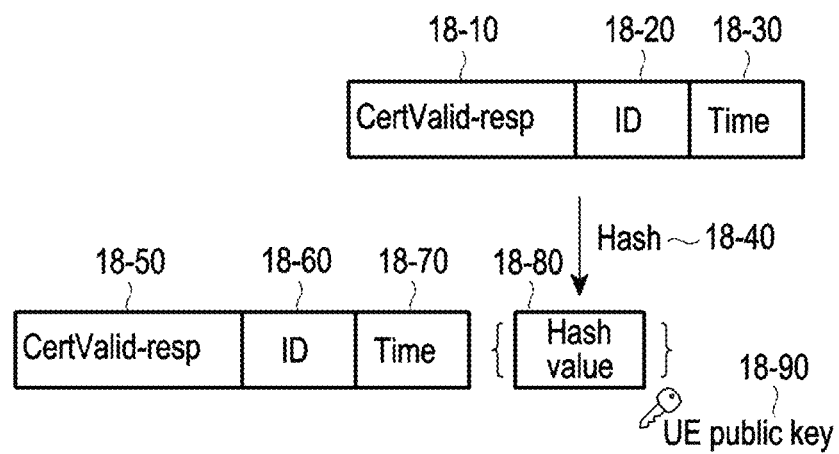
FIG. 18 is a view illustrating an example in which a UE applies an encryption technique to prevent tampering of a certificate validity response message according to an embodiment.

FIG. 18 is a view illustrating an example in which a UE applies an encryption technique to prevent tampering of a certificate validity response message according to an embodiment.

FIG. 18 illustrates an encryption method for providing integrity for a message when a certificate revocation response message is transmitted to a UE.

In an authentication procedure for the UE to receive a mobile communication service, specifically, a procedure for the UE and the base station to authenticate each other, before the base station is authenticated, it needs to be identified whether the certificate is revoked via an unauthorized base station, and thus, a message for identifying whether the certificate is revoked needs to be encrypted and protected.

Referring to FIG. 18, a message (CertValid-resp) 18-10 for responding to whether the certificate is revoked, an ID 18-20, a time 18-30, and a UE public Key 18-90 are shown.

The message (CertValid-resp) 18-10 for responding to whether the certificate is revoked means a message for the CA to send, to the UE, information about whether the certificate is revoked. As an example, the message (CertValid-resp) 18-10 for whether the response the certificate is revoked means a communication message, such as of the CRL or OCSP, but without limitations thereto, may include any message responsive to a communication message by which it may be identified whether the certificate is revoked.

The ID 18-20 or 18-60 denotes the entity sending the message of CertValid-req 18-10. As the ID is included in the encrypted information, the UDM may identify that the message was created by the sender without tampering by a hacker.

The time 18-30 or 18-70 means time information for transmission of the message. As the time is included in the encrypted information, a hacker's replay attack using the message may be prevented. The time format may be expressed in coordinated universal time (UTC) or an offset of UTC, but is not limited only to UTC.

A Hash value 18-80 is a value obtained by calculating a message including at least one of the ID 18-20 and the time 18-30 and CertValid-req 18-10, by a hash function.

In the embodiment of FIG. 18, a message including a value obtained by encrypting at least one of the CertValid-resp 18-10, ID 18-20, and time 18-30 and the Hash value with the operator private key 18-90 may be generated, protecting the message for identifying whether the certificate is revoked.

Figure 19:
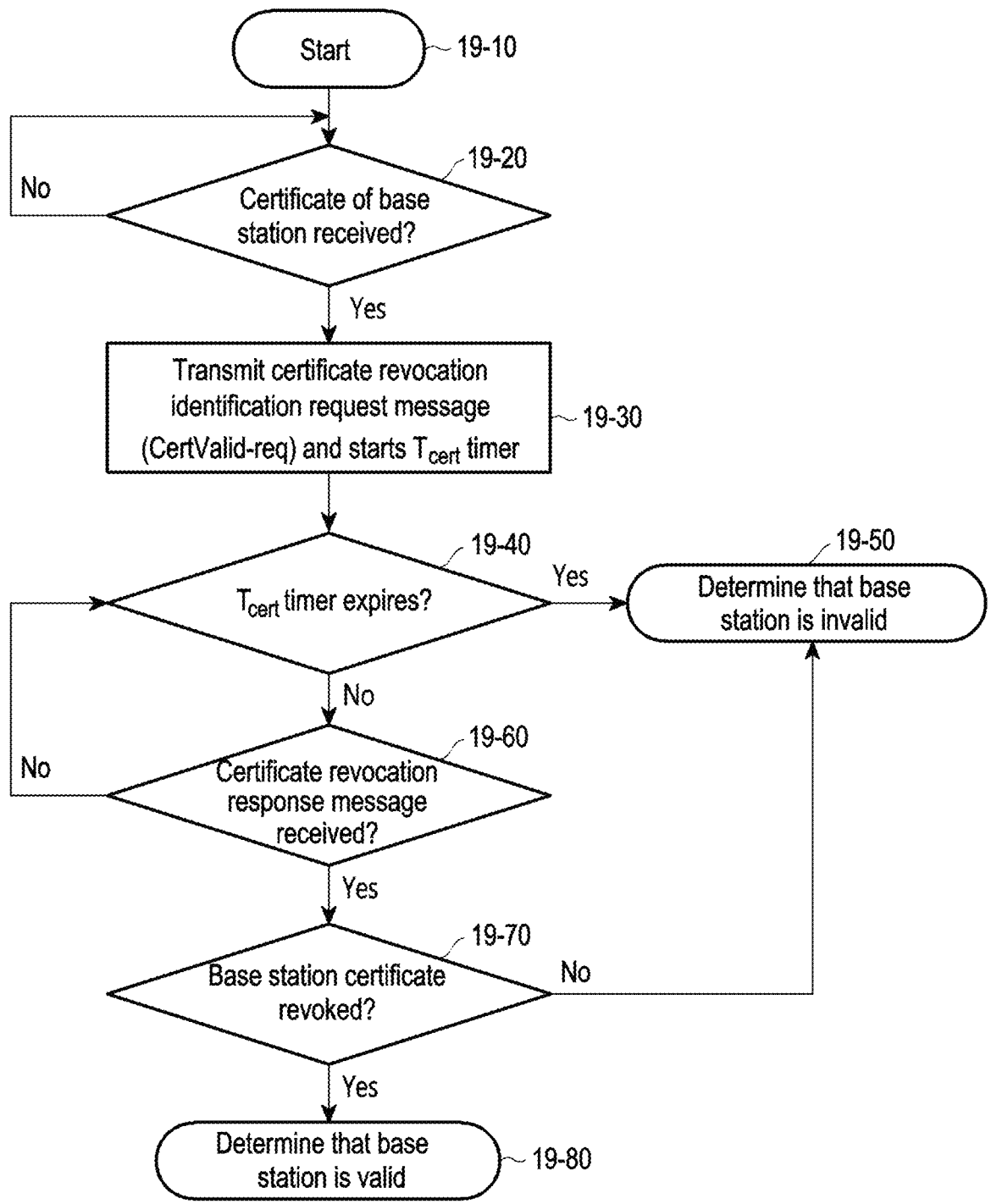
FIG. 19 is a view illustrating a UE's procedure for identifying the validity of a certificate when the UE receives a base station certificate according to an embodiment.

FIG. 19 is a view illustrating a UE's procedure for identifying the validity of a certificate when the UE receives a base station certificate according to an embodiment.

Referring to FIG. 19, the UE may identify whether the base station's certificate is received (19-20). The UE may send a message for identifying whether the certificate is revoked (CertValid-req) to the CA and start a timer $T_{cert}$ (19-30).

If a message responsive to the certificate revocation identification request message (CertValid-req) is not received within the time set by the timer $T_{cert}$ and the timer $T_{cert}$ expires (19-40), the UE may determine that the base station is an invalid base station (19-50).

If a message responsive to the certificate revocation identification request message (CertValid-req) is received within the time set by the timer $T_{cert}$ (19-60), the UE may identify whether the certificate of the base station has been revoked in the certificate revocation response message (19-70).

If the base station certificate is revoked and is thus invalid, the UE may determine that the base station is invalid (19-50). If the base station certificate is not revoked and the base station certificate is valid, the UE may determine that the corresponding base station is valid.

Figure 20:
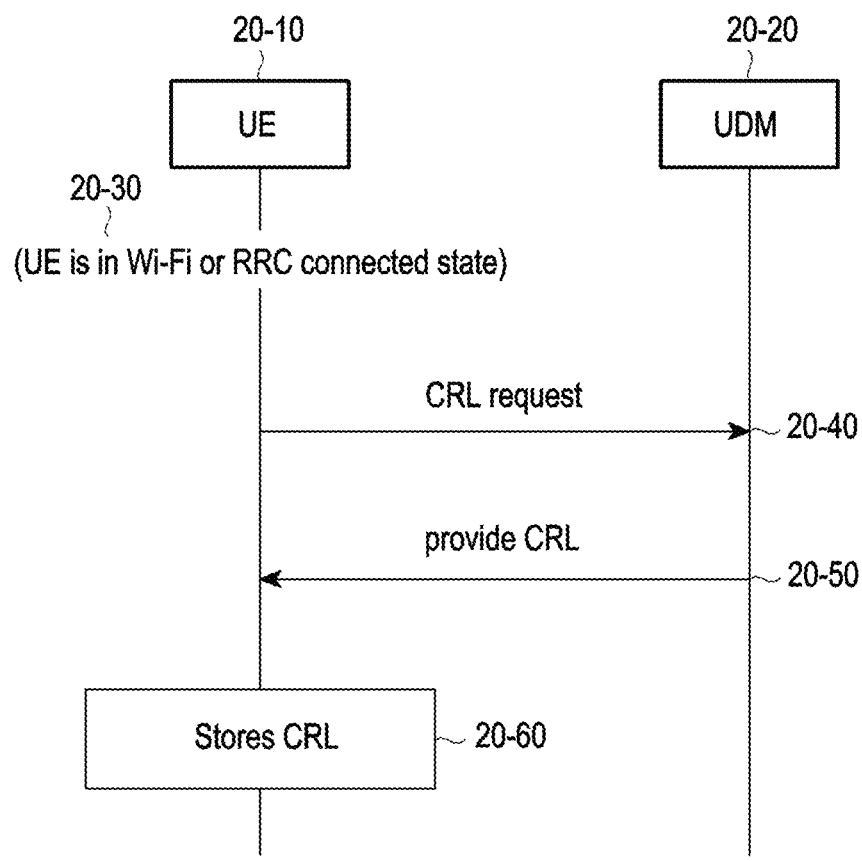
FIG. 20 is a view illustrating a procedure for requesting to download a CRL while a UE is connected with Wi-Fi or RRC (RRC_Connected) according to an embodiment.

FIG. 20 is a view illustrating a procedure for requesting to download a CRL while a UE is connected with Wi-Fi or RRC (RRC_Connected) according to an embodiment.

A CRL has a valid period during which the list is reliable. Therefore, the UE may download the CRL in advance when communication is possible and use the CRL for base station authentication within the valid period.

When the UE 20-10 is in a Wi-Fi connected state or RRC_connected state where communication is possible (20-30), the UE 20-10 may send a request (TLS certificate revocation list download request) for a CRL containing a list of revoked base station certificates to the UDM (or CA) (20-40).

Accordingly, the UDM 20-20 may include the CRL in the certificate revocation response message and transmit the CRL to the UE 20-10 (20-50). The UE 20-10 stores the CRL therein (or database) (20-60) and utilizes the CRL for later authentication.

According to an embodiment, the UE 20-10 may include the past and current location information in the CRL request message (TLS certificate revocation list download request) and transmit the past and current location information (20-40), and the UDM 20-20 may transmit not a list of all the base station certificates to be revoked, but a CRL necessary for the UE, comprehensively considering the location information included in the CRL request message and UE mobility information retained in the network (20-50).

Figure 21:
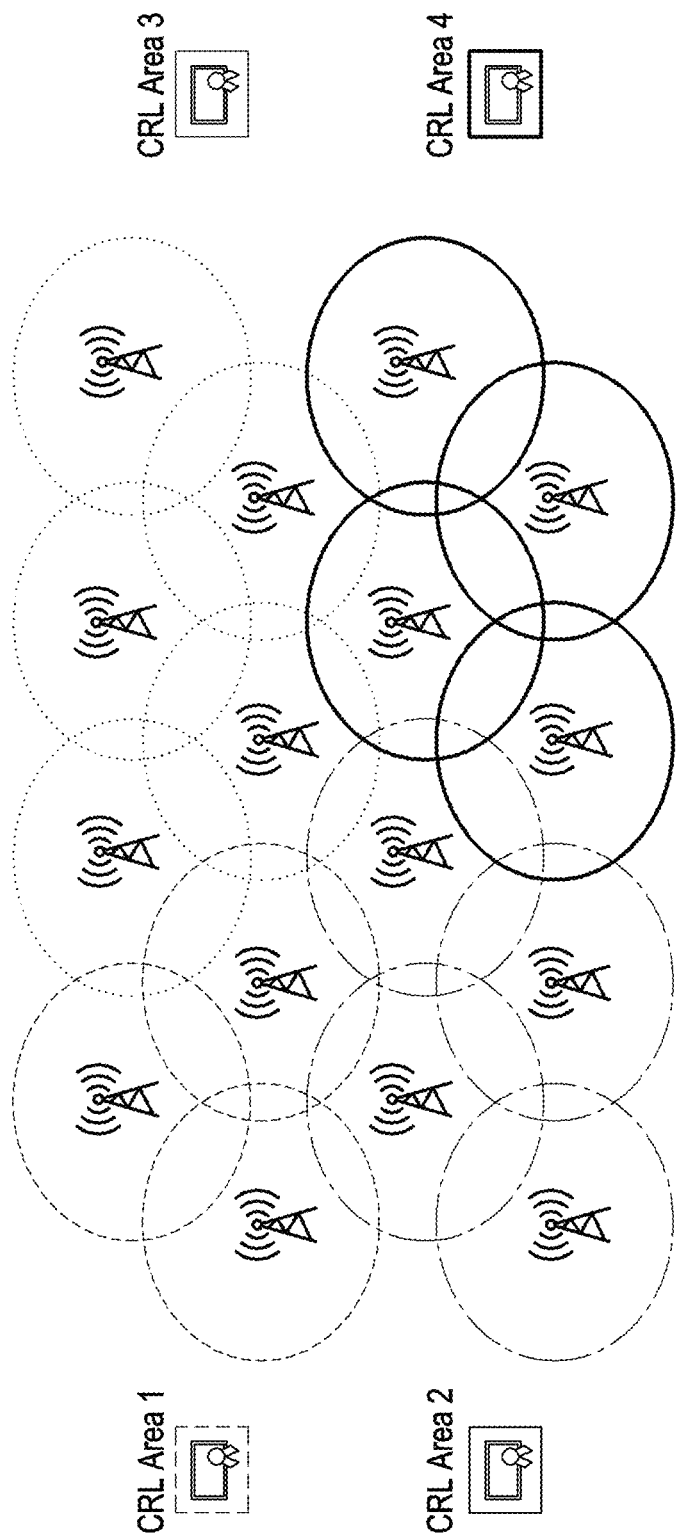
FIG. 21 is a view illustrating an example in which a network manages a plurality of base stations in separate CRL areas according to an embodiment.

FIG. 21 is a view illustrating an example in which a network manages a plurality of base stations in separate CRL areas according to an embodiment.

When the network makes a single CRL for the certificates of all the base stations managed by the network, data is increased, and radio resource waste may occur due to CR transmission/reception. Further, the CRL needs to be updated whenever the base station certificates are updated/revoked.

Thus, a method is provided in which the base stations managed by the network are divided into CRL areas, and the CRLs are managed per district as illustrated in FIG. 21.

The network may generate a CRL for each district considering at least one of the locations of the base stations, average movement information for UEs, movement information for individual UEs, and CRL request statistics according to locations or mobility. When a CRL is generated for each district, e.g., a registration area (RA), tracking area (TA), and base station list may be included so that the UE may be aware of location information when receiving the CRL.

Each district denotes a set of one or more base stations (cells), and one base station may belong to one or more CRL areas. The CRL area is generally composed of base stations in physically adjacent districts, but may not necessarily be physically adjacent.

In the process of transmitting the CRL for each CRL area, the UE may transmit a CRL request message (CRL-req) including, e.g., UE location information (e.g., GPS), base station PCI information, and base station certificate information. The network may transmit, to the UE, the CRL generated by comprehensively considering not only the UE's current location information transmitted by the UE, but also the UE's past mobility information and future mobility information, as predicted, along with base station deployment information in terms of network management.

Figure 22:
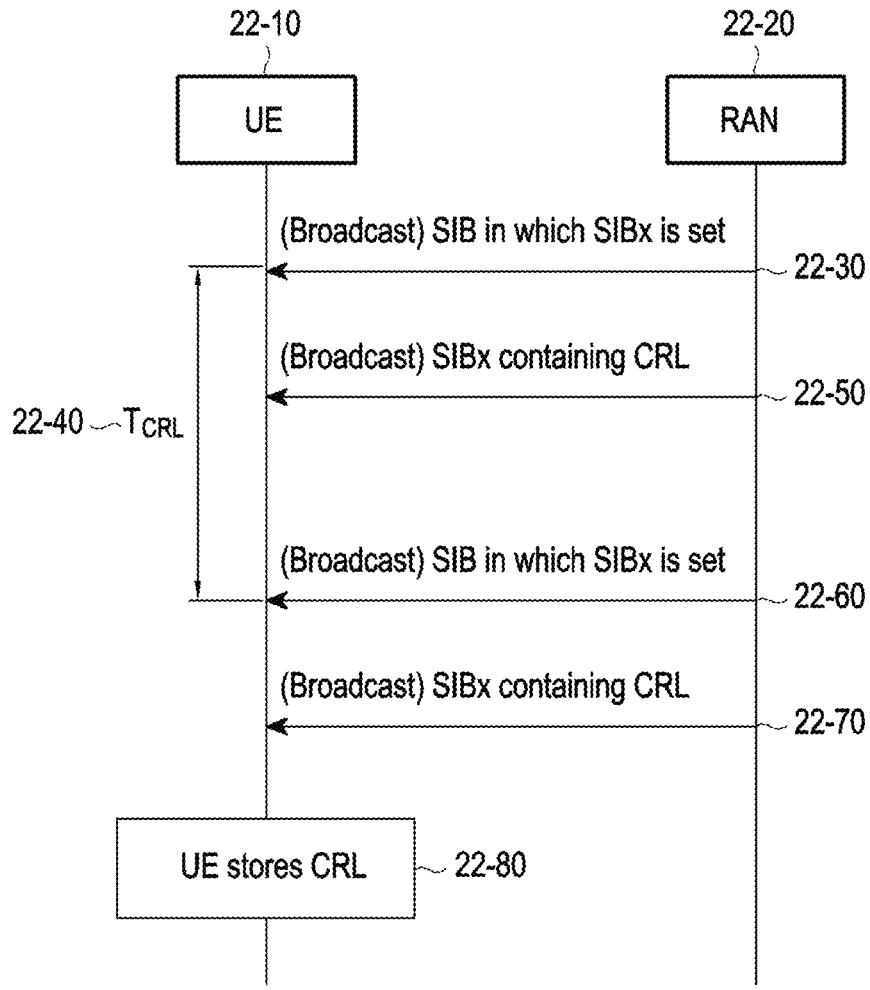
FIG. 22 is a view illustrating a procedure in which a base station broadcasts a CRL to a UE via a system information block (SIB) according to an embodiment.

FIG. 22 is a view illustrating a procedure in which a base station broadcasts a CRL to a UE via a system information block (SIB) according to an embodiment.

Since CRL information is valid information for all the UEs, broadcasting rather than unicasting is advantageous in terms of radio resource efficiency.

The method provided in FIG. 22 is a procedure in which the base station 22-20 periodically (or aperiodically) transmits CRL information to the UE 22-10 through a system information block (SIB).

The base station 22-20 may transmit CRL information to the UE 22-10 periodically (using a $T_{CRL}$ timer) or aperiodically and, upon receiving the CRL broadcast from the base station 22-20, the UE 22-10 may identify whether the certificate of the base station 22-20 is revoked.

By the method, the UE 22-10 may receive CRL information through the SIB of the neighbor cell, as well as from the serving cell. Further, by the method, the UE 22-10 may receive CRL information through the SIB transmitted from the base station 22-20, not only in the RRC connected state but also in the RRC idle state or RRC inactive state, as necessary.

The base station 22-20 may set an information bit for indicating that SIBx for transmitting the CRL is transmitted, in the SIB, and broadcast the information bit (22-30). The base station 22-20 may transmit the SIBx including the CRL (22-50).

The base station 22-20 may transmit the CRL information periodically (using the $T_{CRL}$ timer) (22-40) or aperiodically.

According to an embodiment, in a case where the CRL information is transmitted periodically (using the $T_{CRL}$ timer) (22-40), after the $T_{CRL}$ timer elapses, the base station 22-20 may set an information bit indicating that the SIBx for transmitting the CRL is transmitted, in the SIB, and broadcast the information bit again (22-60). Thereafter, the base station 22-20 may transmit the SIBx including the CRL (22-70).

The UE 22-10 receives the CRL, stores the CRL, and utilizes the CRL to identify whether the certificate is revoked later (22-80). The CRL transmitted by the base station 22-20 has an identifier for the CRL so that it may be distinguished from the CRL transmitted by another base station or the CRL transmitted before and after, and the UE 22-10 may distinguish and manage the identifiers for CRLs. An embodiment of a method for managing an identifier for a CRL of a UE is described below.

Figure 23:
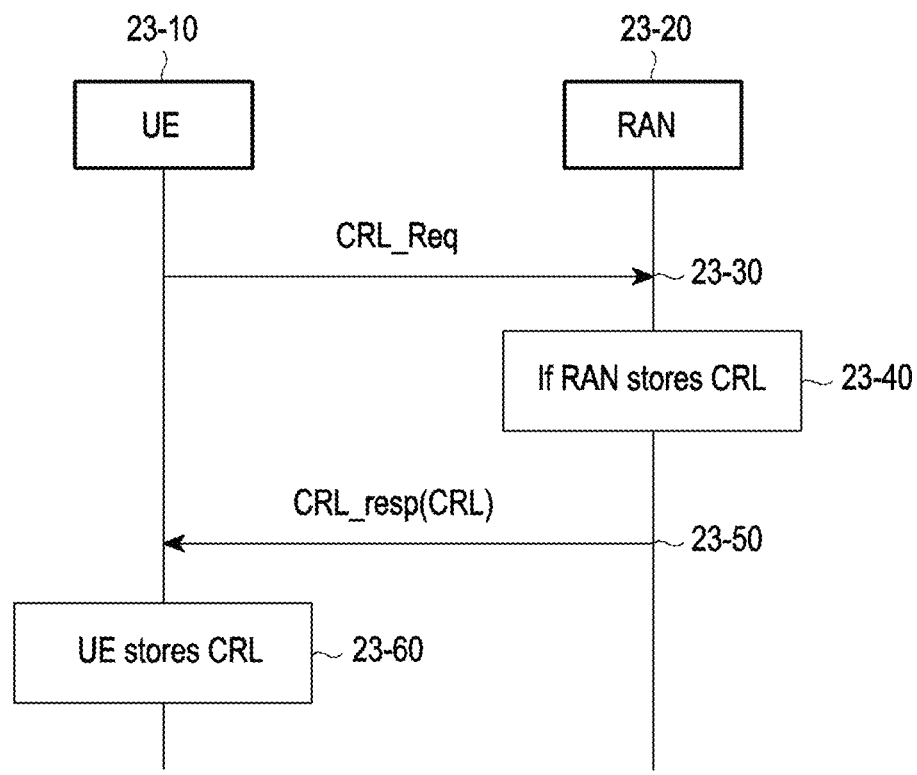
FIG. 23 is a view illustrating a procedure in which a base station transmits CRL information stored therein, in response to a CRL request from a UE according to an embodiment.

FIG. 23 is a view illustrating a procedure in which a base station transmits CRL information stored therein, in response to a CRL request from a UE according to an embodiment.

Since CRL information is valid information for all the UEs, the base station 23-20 may internally store the CRL information and immediately transmit the CRL information to the UE 23-10 rather than downloading and relaying CRL information from the CA each time.

Referring to FIG. 23, the UE 23-10 may send a request for CRL to the CA by transmitting a base station certificate revocation information request message (CRL_Req) to the base station 23-20 (23-30).

The base station 23-20 may identify the base station information, which is to be identified from the message 23-30 transmitted from the UE 22-10, and, if the CRL is present therein (23-40), immediately transmit a CRL request response message (CRL_resp) containing the CRL to the UE 22-10 (23-50).

In the above operation, the UE 22-10 may set a bit enabling the base station 22-20 to reply to the CRL stored therein, in the CRL-req 23-30. If the UE 22-10 wants a reply from the CA instead of the CRL stored inside the base station 22-20, the UE 22-10 may receive the CRL from the CA by refraining from setting the bit.

The UE 23-10 receives the CRL, stores the CRL, and utilizes the CRL to identify whether the certificate is revoked later (23-60). The CRL transmitted by the base station 22-20 has an identifier for the CRL so that it may be distinguished from the CRL transmitted by another base station or the CRL transmitted before and after, and the UE may distinguish and manage the identifiers for CRLs.

Figure 24:
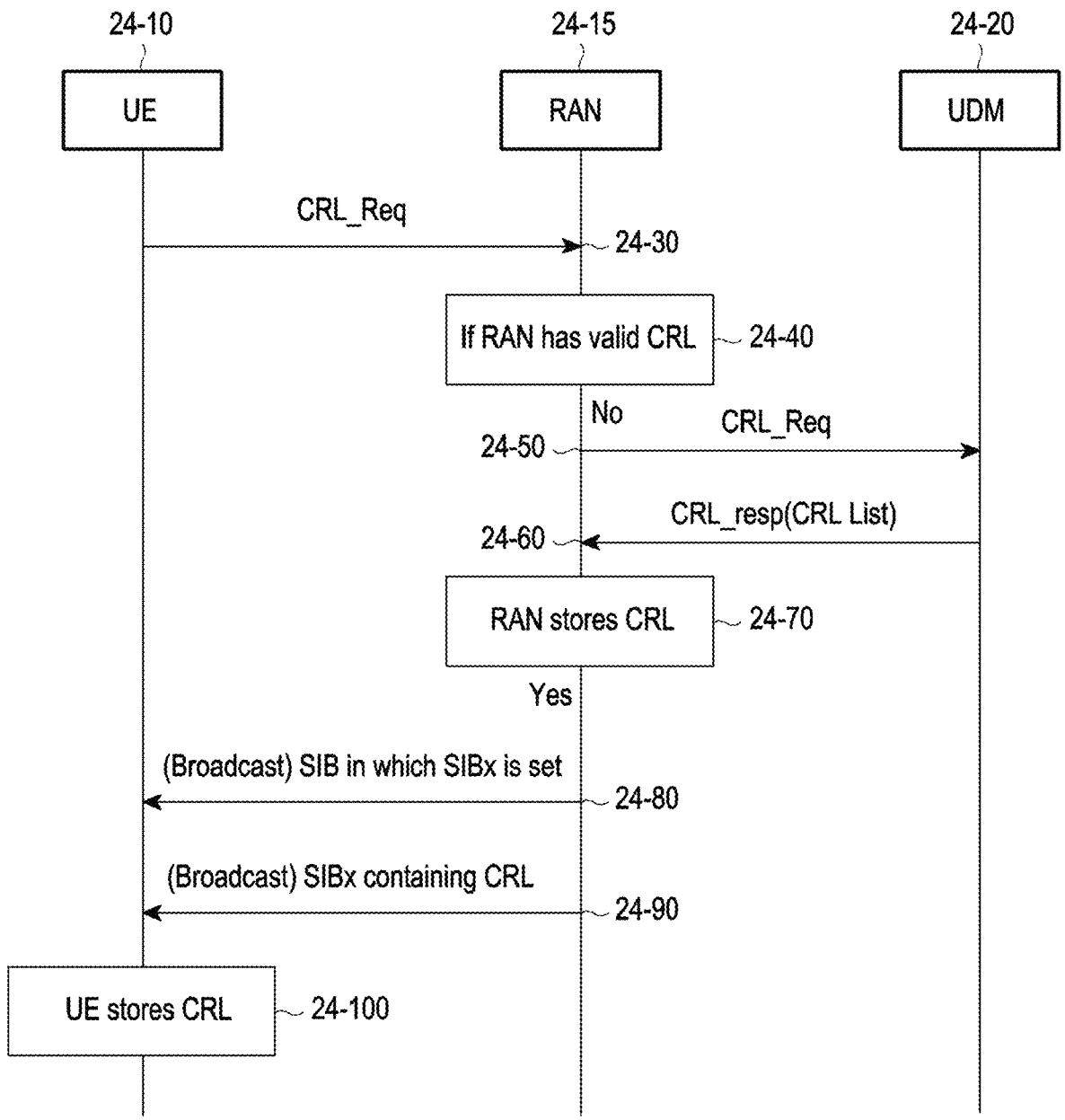
FIG. 24 is a view illustrating a procedure in which a base station broadcasts a CRL responsive to a request from a UE according to an embodiment.

FIG. 24 is a view illustrating a procedure in which a base station broadcasts a CRL responsive to a request from a UE according to an embodiment.

Since CRL information is valid information for all the UEs, the base station 24-20 may internally store the CRL information and immediately transmit the CRL information to the UE 24-10 rather than downloading and relaying CRL information from the CA each time.

Referring to FIG. 24, the UE 24-10 may send a request for CRL to the UDM 24-20 by transmitting a base station certificate revocation information request message (CRL-_Req) to the base station 24-15 (24-30).

The base station 24-15 identifies the base station information in the message (CRL_Req) transmitted by the UE 24-10, and if the CRL does not exist therein, may retransmit a base station certificate revocation information request message (CRL_Req) to the UDM 24-20 (24-50).

When the base station 24-15 receives a certificate revocation information response message (CRL_Resp) from the UDM 24-20 (24-60), the base station 24-15 may store the CRL information therein (24-70).

The base station 24-15 may set a bit for indicating that the SIBx for transmitting the CRL is to be transmitted, in the SIB, and broadcast the bit (24-80). Thereafter, the base station 24-15 may broadcast the SIBx including the CRL (24-90).

The UE 24-10 receives the CRL, stores the CRL, and utilizes the CRL to identify whether the certificate is revoked later (24-100). The CRL transmitted by the base station 24-15 has an identifier for the CRL so that it may be distinguished from the CRL transmitted by another base station or the CRL transmitted before and after, and the UE may distinguish and manage the identifiers for CRLs.

Figure 25:
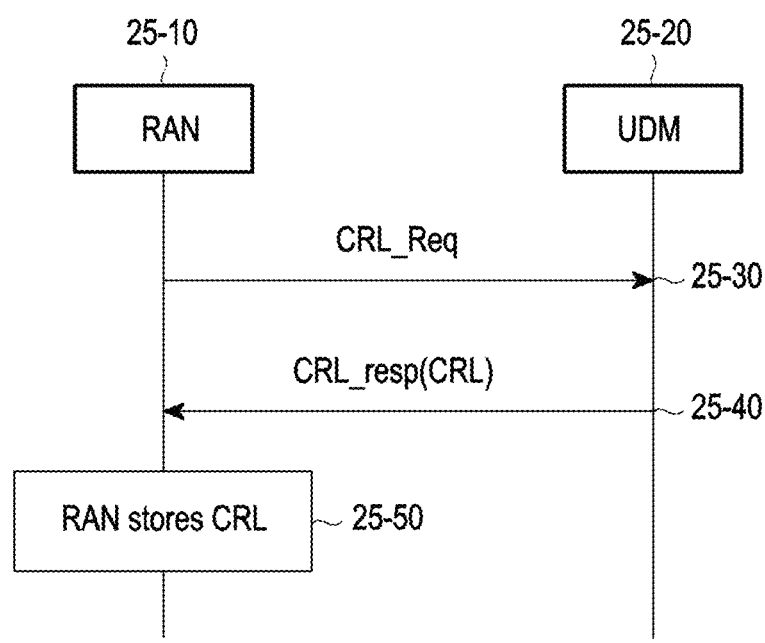
FIG. 25 is a view illustrating a procedure in which a base station sends a request for a CRL to a network and receives a CRL from the network according to an embodiment.

FIG. 25 is a view illustrating a procedure in which a base station sends a request for a CRL to a network and receives a CRL from the network according to an embodiment.

Referring to FIG. 25, the base station 25-10 may transmit a base station certificate revocation information request message (CRL_Req) to the UDM 25-20 (25-30). The UDM 25-20 may transmit a base station certificate revocation response message (CRL_Resp) including the CRL to the base station 25-10 (25-40).

The base station 25-10 may store the CRL information included in the base station certificate revocation response message (CRL_Resp) therein (25-50). The CRL transmitted by the UDM 25-20 has an identifier for the CRL so that it may be distinguished from the CRL transmitted by another base station or the CRL transmitted before and after, and the UE may distinguish and manage them.

Figure 26:
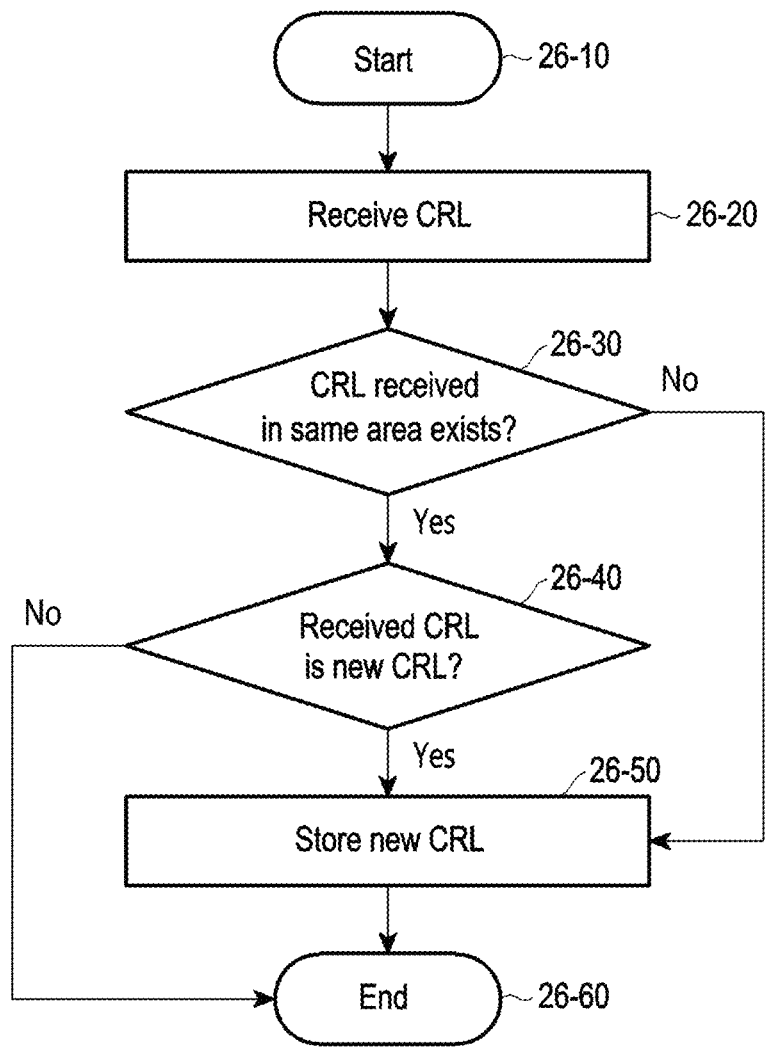
FIG. 26 is a view illustrating a procedure in which a network entity identifies whether a CRL received via unicast or system information block (SIB) is the latest one according to an embodiment.

FIG. 26 is a view illustrating a procedure in which a network entity identifies whether a CRL received via unicast or SIB is the latest one according to an embodiment.

In FIG. 26, the network entity (NE) means any entity that intends to identify whether the certificate is revoked, as well as a UE or a base station.

When the NE receives the CRL (26-20), the NE may identify the identifier for the CRL and identify whether there is a CRL received (stored) in the same area as the received CRL (26-30). If there is no CRL received in the same region, the NE may store the CRL (26-50). The NE may identify the identifier for the CRL and, if there is a CRL received in the same area as the received CRL (26-30), identify whether the CRL is a new CRL (26-40). If the CRL is a new CRL, the NE may store the CRL (26-50).

Figure 27:
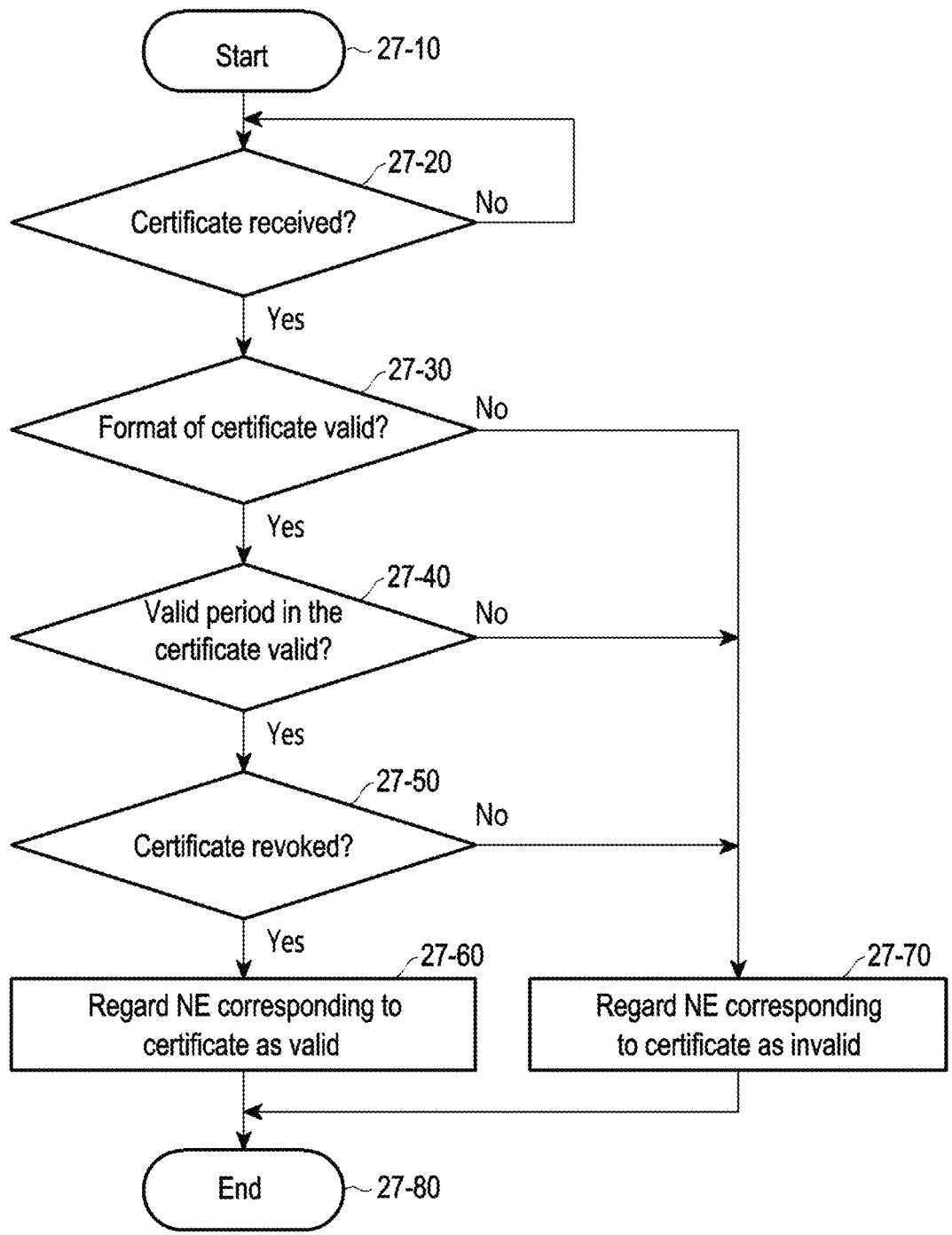
FIG. 27 is a view illustrating an operation in which a network entity authenticates a certificate according to an embodiment.

FIG. 27 is a view illustrating an operation in which a network entity authenticates a certificate according to an embodiment.

In FIG. 27, the network entity (NE) means any entity that intends to identify whether the certificate is revoked, as well as a UE or a base station.

When the NE receives another NE's certificate (27-20), the NE may identify whether the format of the certificate is valid (27-30). If the format of the certificate is valid, the NE may identify whether the certificate has expired by identifying the valid period of the certificate in the certificate (27-40).

If the certificate has not expired, the NE may identify whether the certificate is revoked (27-50). As a result of the identification, if the certificate has not been revoked, the NE corresponding to the certificate may be regarded as a valid NE (27-60).

If any of the procedures 27-30, 27-40, and 27-50 is not met, the NE corresponding to the certificate may be regarded as an invalid NE, and the NE may be determined to have failed in authentication.

Figure 28:
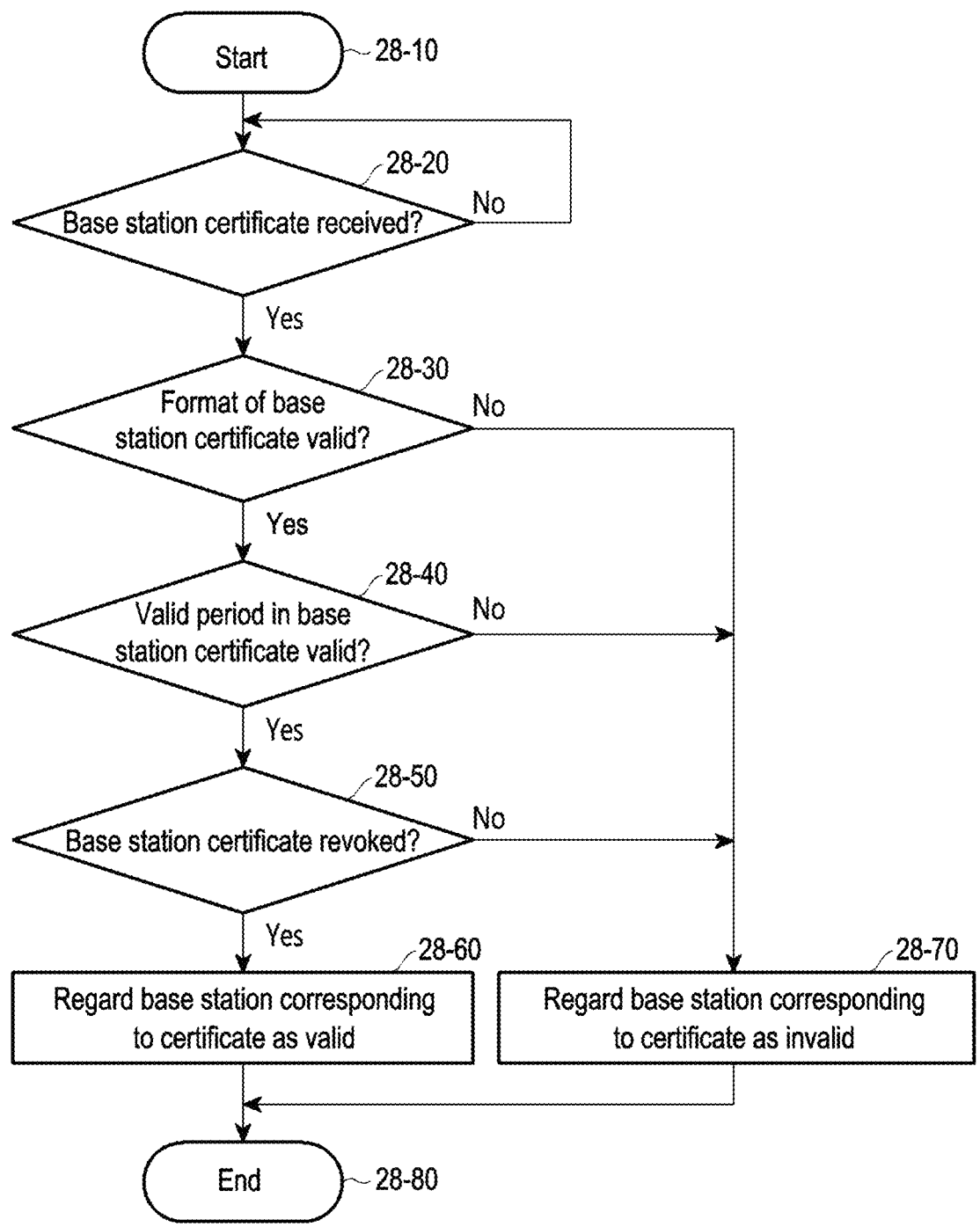
FIG. 28 is a view illustrating an operation in which a UE authenticates a base station certificate according to an embodiment.

FIG. 28 is a view illustrating an operation in which a UE authenticates a base station certificate according to an embodiment.

When the UE receives the base station certificate (28-20), the UE may identify whether the format of the base station certificate is valid (28-30). If the format of the base station certificate is valid, the UE may identify whether the certificate has expired by identifying the authentication valid period of the certificate in the certificate (28-40).

If the base station certificate has not expired, the UE may identify whether the base station certificate is revoked (28-50). As a result of the identification, if the base station certificate has not been revoked, the base station corresponding to the certificate may be regarded as a valid base station (28-60).

If any of the procedures 28-30, 28-40, and 28-50 is not met, the base station corresponding to the certificate may be regarded as an invalid base station, and the UE may determine that authentication of the base station has failed.

Figure 29:
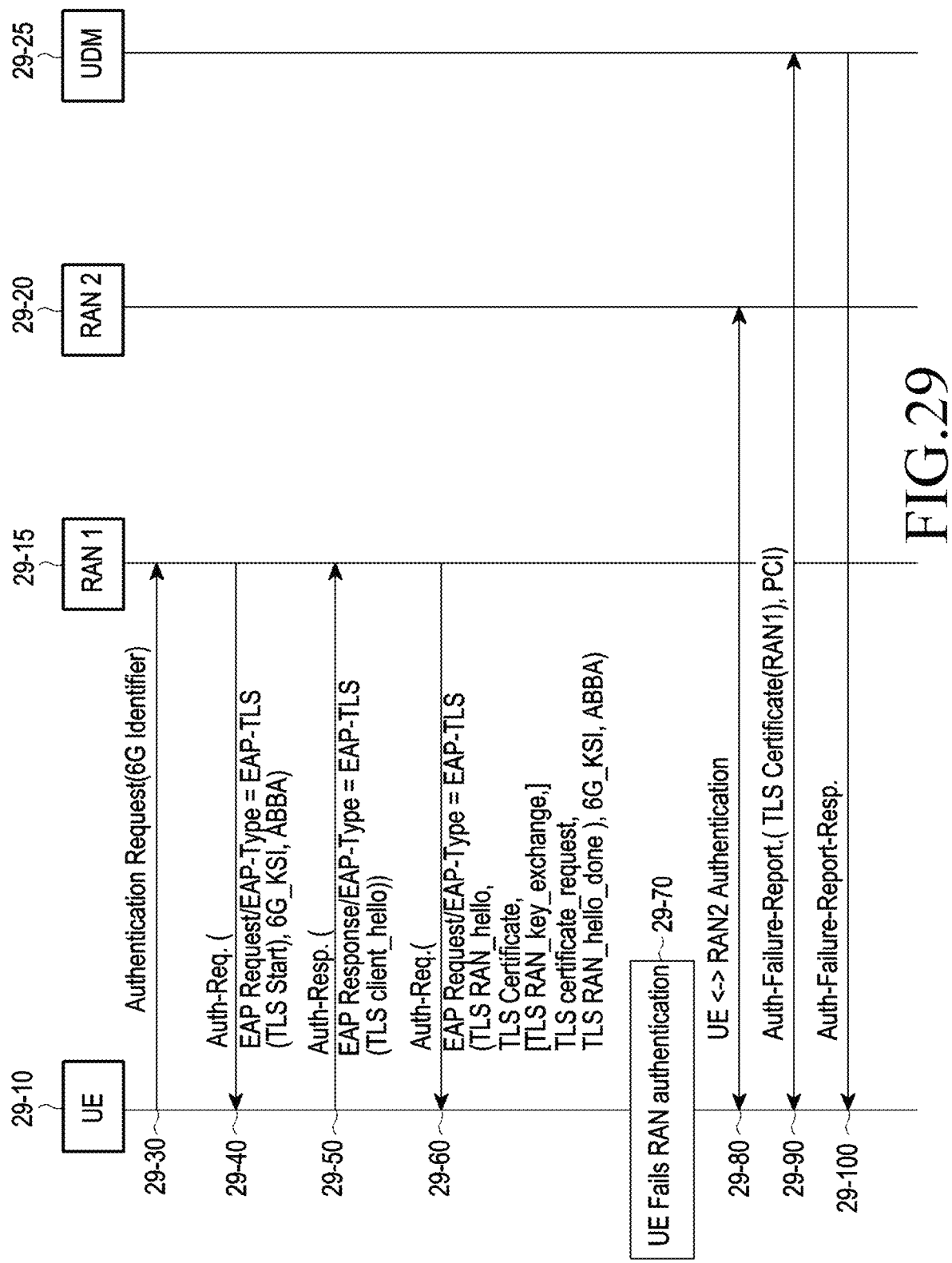
FIG. 29 is a view illustrating an operation when a UE fails to authenticate a base station according to an embodiment.

FIG. 29 is a view illustrating an operation when a UE fails to authenticate a base station according to an embodiment.

FIG. 29 illustrates a procedure in which the UE connected with the base station fails to authenticate the base station and reports this to the network.

Referring to FIG. 29, the UE 29-10 may first transmit an authentication request message (Authentication Request) including its own 6G identifier to a first base station 29-15 to access the first base station 29-15 (29-30).

After receiving an authentication request message from the UE 29-10, the first base station 29-15 may transmit, to the UE, a message (Auth-Req.) for requesting the first base station 29-15 to authenticate via an EAP-TLS (TLS start) (29-40).

The first base station 29-15 may transmit, to the UE 29-10, an authentication request message (Auth-Req) including a 6G key set identifier (6G_KSI), which is an identifier for the authentication, and an anti-bidding down between architectures (ABBA) parameter for preventing a bidding-down of the security feature from a higher release to a lower release (29-40).

When the UE 29-10 receives the TLS start information from the first base station 29-15, the UE 29-10 may transmit an authentication response message (Auth-Resp.) including TLS client_hello information to the first base station 29-15 (29-50).

Upon receiving the TLS client_hello information included in the authentication response message (Auth-Resp.) of the UE 29-10, the first base station 29-15 may transmit, to the UE 29-10, an authentication request message (Auth-Req.) including at least one of TLS RAN_hello, TLS certificate (first base station certificate), TLS RAN_key_exchange, TLS certificate_request (whether a UE certificate is requested), TLS RAN_hello_done information, 6G KSI, and ABBA parameter (29-60).

In this case, the first base station 29-15 may verify the UE certificate by setting a certificate_request unless a TLS emergency call is used. The UE 29-10 may identify the first base station certificate included in the authentication request message of the first base station 29-15, and perform authentication as to whether the first base station certificate is a legitimate certificate (29-70).

In the process where the UE 29-10 identifies the certificate of the first base station 29-15, authentication fails (29-70), and then the UE 29-10 connects to the second base station 29-20 and may successfully perform authentication (29-80).

As NAS communication becomes possible, the UE 29-10 may transmit a message (Auth-Failure-Report) for the failure in the prior authentication of the first base station 29-15 to the UDM 29-25 (29-90). In this case, the message (Auth-Failure-Report) for the failure in the authentication of the first base station 29-15 may include information for the first base station 29-15 that has failed in authentication, such as the certificate of the first base station 29-15 and PCI information. Thereafter, the UDM 29-25 may transmit, to the UE 29-10, a response message (Auth-Failure-Report-Resp.) for the failure in authentication of the first base station 29-15 (29-100).

Figure 30:
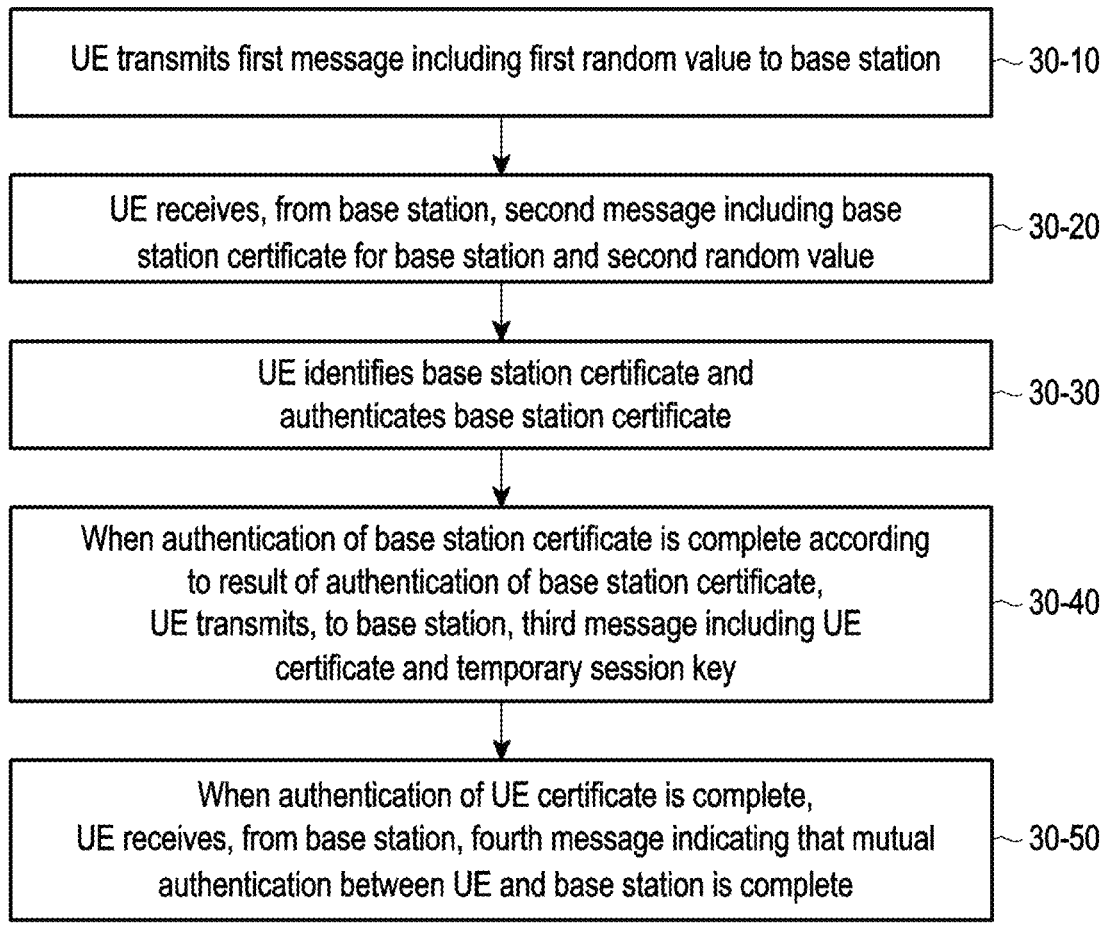
FIG. 30 is a flowchart illustrating a method of operation of a UE for mutual authentication in an access stratum (AS) section according to an embodiment.

FIG. 30 is a flowchart illustrating a method of operation of a UE for mutual authentication in an access stratum (AS) section according to an embodiment.

Referring to FIG. 30, in operations 30-10, the UE may transmit a first message including a first random value to the base station. The first random value may mean a value (or client seed value) for preventing eavesdropping by an entity other than the communication target. The first random value may mean the TLS client_hello information shown in FIGS. 4 to 8B.

In operations 30-20, the UE may receive a second message including a second random value and a base station certificate for the base station from the base station. The second random value may mean a value (or server seed value) for preventing eavesdropping by an entity other than the communication target. The second random value may mean the TLS Server hello information shown in FIGS. 4 to 8B.

In operation 30-30, the UE may identify the base station certificate and authenticate the base station certificate.

In operation 30-40, when the authentication of the base station certificate is complete according to the result of authentication of the base station certificate, the UE may transmit a third message including a UE certificate and a temporary session key to the base station. The temporary session key may be intended for preventing man in the middle (MITM) and may be used when generating a session key. The temporary session key may mean the TLS client_key_exchange information illustrated in FIGS. 4 to 8B.

In operation 30-50, when authentication for the UE certificate is complete, the UE may receive, from the base station, a fourth message indicating that mutual authentication between the UE and the base station is complete.

According to an embodiment, session keys for the UE and the base station may be generated based on the first random value, the second random value, and the temporary session key.

According to an embodiment, the UE may transmit a certificate revocation information request message to the base station to receive revocation information for the base station certificate from a certificate verification server. The UE may receive, from the base station, a certificate revocation information response message including the revocation information for the base station certificate transmitted from the certificate verification server.

According to an embodiment, the revocation information for the base station certificate may be a credential revocation list (CRL) indicating a certificate revocation list or an online certificate status protocol (OCSP) for identifying whether the certificate of the base station certificate is revoked.

According to an embodiment, the UE may perform a mutual authentication procedure between the UE and the certificate verification server. The UE may transmit a certificate revocation information request message to the certificate verification server to request revocation information for the base station certificate. The UE may receive, from the certificate verification server, a certificate revocation information response message including the revocation information for the base station certificate.

According to an embodiment, the revocation information for the base station certificate may be a credential revocation list (CRL) indicating a certificate revocation list or an online certificate status protocol (OCSP) for identifying whether the certificate of the base station certificate is revoked.

According to an embodiment, the certificate revocation information request message may be encrypted based on at least one of the private key of the UE, a hash function, and an operator public key.

According to an embodiment, the certificate revocation information request message may be encrypted together with at least one of identification information for the entity transmitting the certificate revocation information request message and time information for transmission of the certificate revocation information request message.

According to an embodiment, the certificate revocation information response message may be encrypted based on at least one of the private key of the UE, the hash function, and the operator public key.

According to an embodiment, the certificate revocation information response message may be encrypted together with at least one of identification information for the entity that receives the certificate revocation information response message and time information for transmission of the certificate revocation information response message.

According to an embodiment, the CRL may be managed for each registration area (RA) or for each tracking area (TA) based on location information for at least one base station and movement information for at least one UE.

According to an embodiment, the UE may receive a first SIB from the base station. The UE may receive, from the base station, a second SIB including a credential revocation list (CRL) indicating a certificate revocation list, based on the first SIB.

According to an embodiment, the UE may fail to authenticate the base station certificate according to a result of authentication of the base station certificate and then perform a mutual authentication procedure with another base station. The UE may transmit an authentication failure report message, indicating that mutual authentication with the base station fails, to the certificate verification server. The UE may receive, from the certificate verification server, an authentication failure report response message corresponding to the authentication failure report message.

Figure 31:
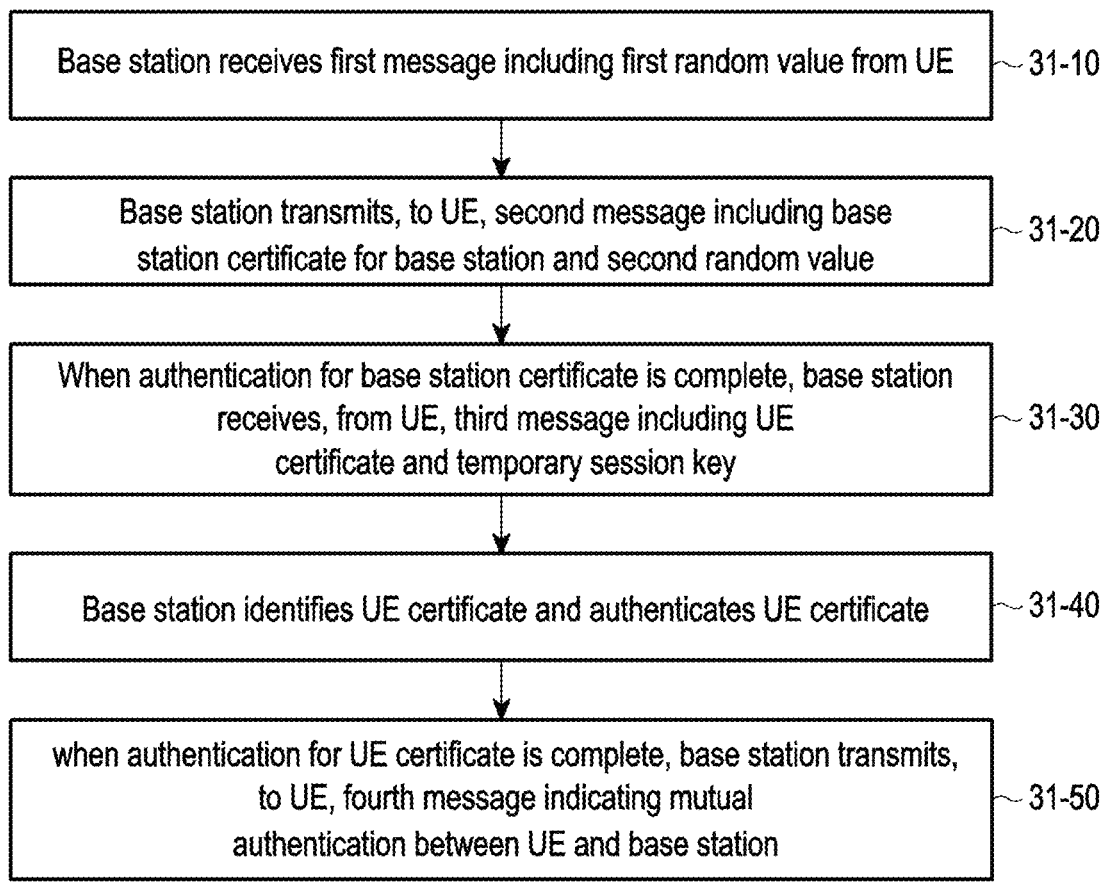
FIG. 31 is a flowchart illustrating a method of operation of a base station for mutual authentication in an access stratum (AS) section according to an embodiment.

FIG. 31 is a flowchart illustrating a method of operation of a base station for mutual authentication in an access stratum (AS) section according to an embodiment.

Referring to FIG. 31, in operations 31-10, the base station may receive a first message including a first random value from the UE. The first random value may mean a value (or client seed value) for preventing eavesdropping by an entity other than the communication target. The first random value may mean the TLS client_hello information shown in FIGS. 4 to 8B.

In operations 31-20, the base station may transmit a second message including a second random value and a base station certificate for the base station to the UE. The second random value may mean a value (or server seed value) for preventing eavesdropping by an entity other than the communication target. The second random value may mean the TLS Server hello information shown in FIGS. 4 to 8B.

In operation 31-30, when authentication for the base station certificate is complete, the base station may receive a third message including a UE certificate and a temporary session key from the UE. The temporary session key may be intended for preventing man in the middle (MITM) and may be used when generating a session key. The temporary session key may mean the TLS client_key_exchange information illustrated in FIGS. 4 to 8B.

In operation 31-40, the base station may identify the UE certificate and authenticate the UE certificate.

In operation 31-50, when authentication for the UE certificate is complete, the base station may transmit, to the UE, a fourth message indicating that mutual authentication between the UE and the base station is complete.

According to an embodiment, session keys for the UE and the base station may be generated based on the first random value, the second random value, and the temporary session key.

According to an embodiment, the base station may receive, from the UE, a certificate revocation information request message for the UE to receive revocation information for the base station certificate from a certificate verification server. The base station may transmit, to the UE, a certificate revocation information response message including the revocation information for the base station certificate transmitted from the certificate verification server.

According to an embodiment, the revocation information for the base station certificate may be a credential revocation list (CRL) indicating a certificate revocation list or an online certificate status protocol (OCSP) for identifying whether the certificate of the base station certificate is revoked.

According to an embodiment, the certificate revocation information request message may be encrypted based on at least one of the private key of the UE, a hash function, and an operator public key.

According to an embodiment, the certificate revocation information response message may be encrypted based on at least one of the private key of the UE, a hash function, and an operator public key.

According to an embodiment, the CRL may be managed for each registration area (RA) or for each tracking area (TA) based on location information for at least one base station and movement information for at least one UE.

According to an embodiment, the base station may transmit a first SIB to the UE. The base station may transmit, to the UE, a second SIB including a credential revocation list (CRL) indicating a certificate revocation list, based on the first SIB.

Figure 32:
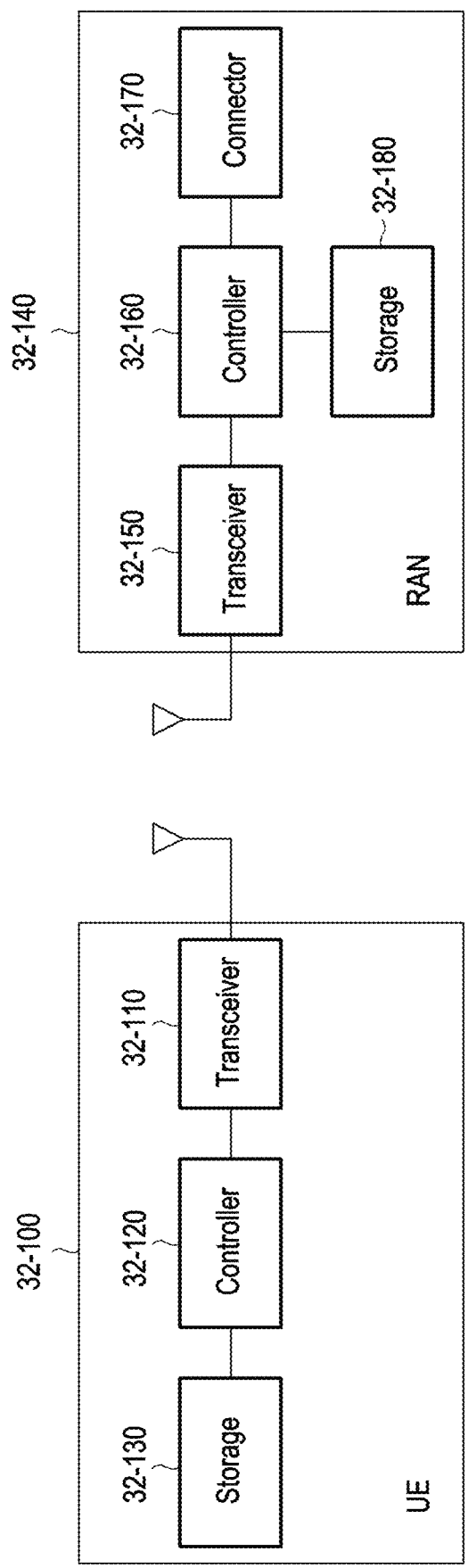
FIG. 32 is a block diagram illustrating a UE and a base station according to an embodiment.

FIG. 32 is a block diagram illustrating a UE and a base station according to an embodiment.

Referring to FIG. 32, the UE 32-100 may include a transceiver 32-110, a controller 32-120, and a storage 32-130. However, the components of the UE 32-100 are not limited to the above-described examples. For example, the UE 32-100 may include more or fewer components than those illustrated. The transceiver 32-110, the storage 32-130, and the controller 32-120 may be implemented in the form of a single chip.

The transceiver 32-110 may transmit/receive signals to/from the base station 32-140. The signal may include control information and data. To that end, the transceiver 32-110 may include a radio frequency (RF) transmitter for frequency-up converting and amplifying signals transmitted and an RF receiver for low-noise amplifying signals received and frequency-down converting the frequency of the received signals. However, this is merely an example of the transceiver 32-110, and the components of the transceiver 32-110 are not limited to the RF transmitter and the RF receiver. The transceiver 32-110 may receive signals via a radio channel, output the signals to the controller 32-120, and transmit signals output from the controller 32-120 via a radio channel. The transceiver 32-110 may separately include an RF transceiver for a first wireless communication technique and an RF transceiver for a second wireless communication technique or may perform physical layer processing according the first wireless communication technique and the second wireless communication technique using a single transceiver.

The storage 32-130 may store a program and data necessary to operate the UE 32-100. The storage 32-130 may store control information or data included in signals transmitted and received by the UE 32-100. The storage 32-130 may include a storage medium, such as ROM, RAM, hard disk, CD-ROM, and DVD, or a combination of storage media. There may be provided a plurality of storage 32-130.

The controller 32-120 may control a series of operations to allow the UE 32-100 to operate according to the above-described embodiments. For example, the controller 32-120 may perform computation and determination on authentication information and certificate information received from the base station 32-140 through the transceiver 32-110. There may be provided a plurality of controllers 32-120. The controller 32-120 may control the components of the UE 32-100 by executing a program stored in the storage 32-130.

The base station 32-140 may include a transceiver 32-150, a controller 32-160, a connector 32-170, and a storage 32-180. However, the components of the base station 32-140 are not limited to the above-described examples. For example, the base station 32-150 may include more or fewer components than those illustrated. The transceiver 32-150, the storage 32-180, and the controller 32-160 may be implemented in the form of a single chip.

The transceiver 32-150 may transmit/receive signals to/from the UE 32-100. The signal may include control information and data. To that end, the transceiver 32-150 may include a radio frequency (RF) transmitter for frequency-up converting and amplifying signals transmitted and an RF receiver for low-noise amplifying signals received and frequency-down converting the frequency of the received signals. However, this is merely an example of the transceiver 32-150, and the components of the transceiver 32-150 are not limited to the RF transmitter and the RF receiver. The transceiver 32-150 may receive signals via a radio channel, output the signals to the controller 32-160, and transmit signals output from the controller 32-160 via a radio channel.

The controller 32-160 may control a series of operations to allow the base station 32-140 to operate according to the above-described embodiments. For example, the controller 32-160 may generate authentication and certificate information to be transmitted to the UE 32-100 and transmit them to the UE 32-100 through the transceiver 32-150. There may be provided a plurality of controllers 32-160. The controller 32-160 may control the components of the base station 32-140 by executing a program stored in the storage 32-180.

The storage 32-180 may store programs and data necessary for the operation of the base station. The storage 32-180 may store control information or data included in signals transmitted and received by the base station. The storage 32-180 may include a storage medium, such as ROM, RAM, hard disk, CD-ROM, and DVD, or a combination of storage media. There may be provided a plurality of storage 32-140.

The connector 32-170 is a device that connects the base station 32-140 with the core network, and may perform physical layer processing for message transmission and reception, transmit messages to the core network, and receive messages from the core network.

The methods according to the embodiments descried in the specification or claims of the disclosure may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, ROMs, electrically erasable programmable read-only memories (EEPROMs), magnetic disc storage devices, compact-disc ROMs, digital versatile discs DVDs), or other types of optical storage devices, or magnetic cassettes. Or the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments of the disclosure via an external port. A separate storage device over the communication network may be connected to the device that performs embodiments of the disclosure.

In the above-described specific embodiments, the components included in the disclosure are represented in singular or plural forms depending on specific embodiments provided. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

As is apparent from the foregoing description, according to the disclosure, it is possible to reinforce security upon wireless communication between a UE and a base station via PKI-based access stratum (AS) authentication in a wireless communication system.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a user equipment (UE) for a mutual authentication operation in an access stratum (AS) section in a wireless communication system, the method comprising:
    transmitting, to a base station, a first message including a first random value;

receiving, from the base station, a second message including a second random value and a base station certificate for the base station in response to transmitting the first message;

transmitting, to the base station, a certificate revocation information request message to receive revocation information for the base station certificate from a certificate verification server;

receiving, from the base station, a certificate revocation information response message including the revocation information for the base station certificate;

determining whether the base station certificate is valid based on the revocation information for the base station certificate;

transmitting, to the base station, a third message including a UE certificate and a temporary session key based on a determination that the base station certificate is valid; and receiving, from the base station, a fourth message indicating that the mutual authentication operation between the UE and the base station is completed in case that an authentication operation of the UE certificate is completed, wherein a session key for the base station is generated based on the first random value, the second random value, and the temporary session key, and wherein the revocation information for the base station certificate comprises a credential revocation list (CRL) indicating a certificate revocation list, and the revocation information for the base station certificate is identified per registration area (RA) or per tracking area (TA) based on location information for at least one base station and movement information for at least one UE.

2. The method of claim 1, wherein the certificate revocation information request message is encrypted based on at least one of a private key of the UE, a hash function, or an operator public key.

3. The method of claim 2, wherein the certificate revocation information request message is encrypted along with at least one of identification information for an entity transmitting the certificate revocation information request message or time information for transmission of the certificate revocation information request message.

4. The method of claim 1, wherein the certificate revocation information response message is encrypted based on at least one of an operator private key, a hash function, or an operator public key.

5. The method of claim 4, wherein the certificate revocation information response message is encrypted along with at least one of identification information for an entity receiving the certificate revocation information response message or time information for transmission of the certificate revocation information response message.

6. The method of claim 1, further comprising:
performing the mutual authentication operation with another base station based on a determination that the base station certificate is invalid;
transmitting, to a certificate verification server, an authentication failure report message indicating a failure of the mutual authentication operation with the base station in case that the mutual authentication operation with the other base station is completed; and
receiving, from the certificate verification server, an authentication failure report response message in response to transmitting the authentication failure report message.

7. A method of a base station for a mutual authentication operation in an access stratum (AS) section in a wireless communication system, the method comprising:
receiving, from a UE, a first message including a first random value;
transmitting, to the UE, a second message including a second random value and a base station certificate for the base station in response to receiving the first message;
receiving, from the UE, a certificate revocation information request message to receive revocation information for the base station certificate from a certificate verification server;
transmitting, to the UE, a certificate revocation information response message including the revocation information for the base station certificate;
receiving, from the UE, a third message including a UE certificate and a temporary session key in case that an authentication operation of the base station certificate is completed; and
determining whether the UE certificate is valid based on information included in the UE certificate; and
transmitting, to the UE, a fourth message indicating that the mutual authentication operation between the UE and the base station is completed based on a determination that the UE certificate is valid,
wherein a session key for the base station is generated based on the first random value, the second random value, and the temporary session key, and
wherein the revocation information for the base station certificate comprises a credential revocation list (CRL) indicating a certificate revocation list, and the revocation information for the base station certificate is identified per registration area (RA) or per tracking area (TA) based on location information for at least one base station and movement information for at least one UE.

8. The method of claim 7, wherein the certificate revocation information request message is encrypted based on at least one of a private key of the UE, a hash function, or an operator public key, and
wherein the certificate revocation information response message is encrypted based on at least one of an operator private key, a hash function, or an operator public key.

9. A user equipment (UE) for a mutual authentication operation in an access stratum (AS) section in a wireless communication system, the UE comprising:
a transceiver; and
a controller coupled with the transceiver and configured to control the transceiver to:
transmit, to a base station, a first message including a first random value,
receive, from the base station, a second message including a second random value and a base station certificate for the base station, in response to transmitting the first message,
transmit, to the base station, a certificate revocation information request message to receive revocation information for the base station certificate from a certificate verification server,
receive, from the base station, a certificate revocation information response message including the revocation information for the base station certificate,
determine whether the base station certificate is valid based on the revocation information for the base station certificate, transmit, to the base station, a third message including a UE certificate and a temporary session key based on a determination that the base station certificate is valid, and receive, from the base station, a fourth message indicating that the mutual authentication operation between the UE and the base station is completed in case that an authentication operation of the UE certificate is completed, wherein a session key for the base station is generated based on the first random value, the second random value, and the temporary session key, and wherein the revocation information for the base station certificate comprises a credential revocation list (CRL) indicating a certificate revocation list, and the revocation information for the base station certificate is identified per registration area (RA) or per tracking area (TA) based on location information for at least one base station and movement information for at least one UE.

10. The UE of claim 9, wherein the certificate revocation information request message is encrypted based on at least one of a private key of the UE, a hash function, or an operator public key, and wherein the certificate revocation information response message is encrypted based on at least one of an operator private key, a hash function, or an operator public key.

11. A base station for performing a mutual authentication operation in an access stratum (AS) section in a wireless communication system, comprising:

a transceiver; and a controller coupled with the transceiver and configured to control the transceiver to:

receive, from a user equipment (UE), a first message including a first random value, transmit, to the UE, a second message including a second random value and a base station certificate for the base station, in response to receiving the first message, receive, from the UE, a certificate revocation information request message to receive revocation information for the base station certificate from a certificate verification server, transmit, to the UE, a certificate revocation information response message including the revocation information for the base station certificate, receive, from the UE, a third message including a UE certificate and a temporary session key in case that an authentication operation of the base station certificate is completed, determine whether the UE certificate is valid based on information included in the UE certificate, and transmit, to the UE, a fourth message indicating that the mutual authentication operation between the UE and the base station is completed based on a determination that the UE certificate is valid, wherein a session key for the base station is generated based on the first random value, the second random value, and the temporary session key, and wherein the revocation information for the base station certificate comprises a credential revocation list (CRL) indicating a certificate revocation list, and the revocation information for the base station certificate is identified per registration area (RA) or per tracking area (TA) based on location information for at least one base station and movement information for at least one UE.

12. A method of a user equipment (UE) for a mutual authentication operation in an access stratum (AS) section in a wireless communication system, the method comprising:

receiving, from a base station, a first system information block (SIB);

receiving, from the base station, a second SIB including a credential revocation list (CRL) indicating a certificate revocation list for a base station certificate for the base station based on the first SIB;

transmitting, to the base station, a first message including a first random value;

receiving, from the base station, a second message including a second random value and the base station certificate for the base station in response to transmitting the first message;

determining whether the base station certificate is valid based on the CRL;

transmitting, to the base station, a third message including a UE certificate and a temporary session key based on a determination that the base station certificate is valid; and receiving, from the base station, a fourth message indicating that the mutual authentication operation between the UE and the base station is completed in case that an authentication operation of the UE certificate is completed, wherein a session key for the base station is generated based on the first random value, the second random value, and the temporary session key.

13. A method of a base station for a mutual authentication operation in an access stratum (AS) section in a wireless communication system, the method comprising:

transmitting, to a user equipment (UE), a first system information block (SIB);

transmitting, to the UE, a second SIB including a credential revocation list (CRL) indicating a certificate revocation list for a base station certificate for the base station based on the first SIB;

receiving, from the UE, a first message including a first random value;

transmitting, to the UE, a second message including a second random value and the base station certificate for the base station in response to receiving the first message;

receiving, from the UE, a third message including a UE certificate and a temporary session key in case that an authentication operation of the base station certificate is completed;

determining whether the UE certificate is valid based on information included in the UE certificate; and transmitting, to the UE, a fourth message indicating that the mutual authentication operation between the UE and the base station is completed based on a determination that the UE certificate is valid, wherein a session key for the base station is generated based on the first random value, the second random value, and the temporary session key.

* * * * *